United States Patent
Buma

(10) Patent No.: US 7,896,360 B2
(45) Date of Patent: Mar. 1, 2011

(54) VEHICLE STABILIZER SYSTEM

(75) Inventor: Shuuichi Buma, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 251 days.

(21) Appl. No.: 12/278,902

(22) PCT Filed: Feb. 2, 2007

(86) PCT No.: PCT/JP2007/052308

§ 371 (c)(1),
(2), (4) Date: Aug. 8, 2008

(87) PCT Pub. No.: WO2007/091666

PCT Pub. Date: Aug. 16, 2007

(65) Prior Publication Data

US 2010/0164189 A1    Jul. 1, 2010

(30) Foreign Application Priority Data

Feb. 9, 2006    (JP) .............................. 2006-032592

(51) Int. Cl.
*B60G 17/005* (2006.01)
*B60G 21/055* (2006.01)

(52) U.S. Cl. ................. 280/5.511; 280/5.52; 280/5.51; 280/5.502

(58) Field of Classification Search .............. 280/5.511, 280/5.502, 5.506, 5.52, 5.51, 5.521
See application file for complete search history.

(56) References Cited

U.S. PATENT DOCUMENTS 5,480,186 A * 1/1996 Smith ...................... 280/5.511

| 7,543,823 B2 * | 6/2009 | Buma et al. ............... 280/5.502 |
| 2005/0110228 A1 * | 5/2005 | Fujimori ................... 280/5.511 |
| 2005/0179220 A1 * | 8/2005 | Yasui et al. ............... 280/5.506 |
| 2005/0206100 A1 * | 9/2005 | Ohta et al. ................ 280/5.511 |

(Continued)

FOREIGN PATENT DOCUMENTS

EP    0 393 399    10/1990

(Continued)

OTHER PUBLICATIONS

Jost K: "TRW Develops Active Roll Control", Society of Automotive Engineer, vol. 109, No. 9, XP001111238, pp. 60,62 (2001).

*Primary Examiner*—Paul N Dickson
*Assistant Examiner*—Drew Brown
(74) *Attorney, Agent, or Firm*—Oblon, Spivak, McClelland, Maier & Neustadt, L.L.P.

(57) ABSTRACT

A vehicle stabilizer system including: (a) a stabilizer bar (28) including (a-1) a torsion bar portion (90), and (a-2) an arm portion (92) that extends from the torsion bar portion in a direction not parallel to the torsion bar portion; (b) an actuator (32) configured to rotate the stabilizer bar about an axis of the torsion bar portion; and (c) a link rod (34) interconnecting the suspension arm (78) and one of opposite ends of the arm portion that is remote from the torsion bar portion. The stabilizer bar generates a stabilizing force which is dependent on a reaction that is generated as a result of torsion of the torsion bar portion, and which forces the wheel (12) and the body in a selected one of a direction toward each other and a direction away from each other. The actuator allows the stabilizer bar to generate the stabilizing force whose magnitude is changeable by operation of the actuator. The link rod is inclined with respect to the suspension arm to which the link rod is connected, such that an angle defined by the link rod and the suspension arm is not 90°.

23 Claims, 23 Drawing Sheets

U.S. PATENT DOCUMENTS

| | | |
|---|---|---|
| 2006/0138732 A1* | 6/2006 | Buma et al. .................. 280/5.5 |
| 2006/0273539 A1* | 12/2006 | Barth et al. ........... 280/124.107 |
| 2008/0111326 A1* | 5/2008 | Taneda et al. ............ 280/5.511 |
| 2009/0008887 A1* | 1/2009 | Buma ....................... 280/5.511 |

FOREIGN PATENT DOCUMENTS

| | | |
|---|---|---|
| EP | 0 512 358 B1 | 3/1996 |
| FR | 1 489 223 | 7/1967 |
| JP | 2002 518245 | 6/2002 |
| JP | 2004-17704 | 1/2004 |
| JP | 2004 314947 | 11/2004 |
| JP | 2005-193701 | 7/2005 |
| JP | 2007-118672 | 5/2007 |
| KR | 2002-0055815 | 7/2002 |

* cited by examiner

FIG.7
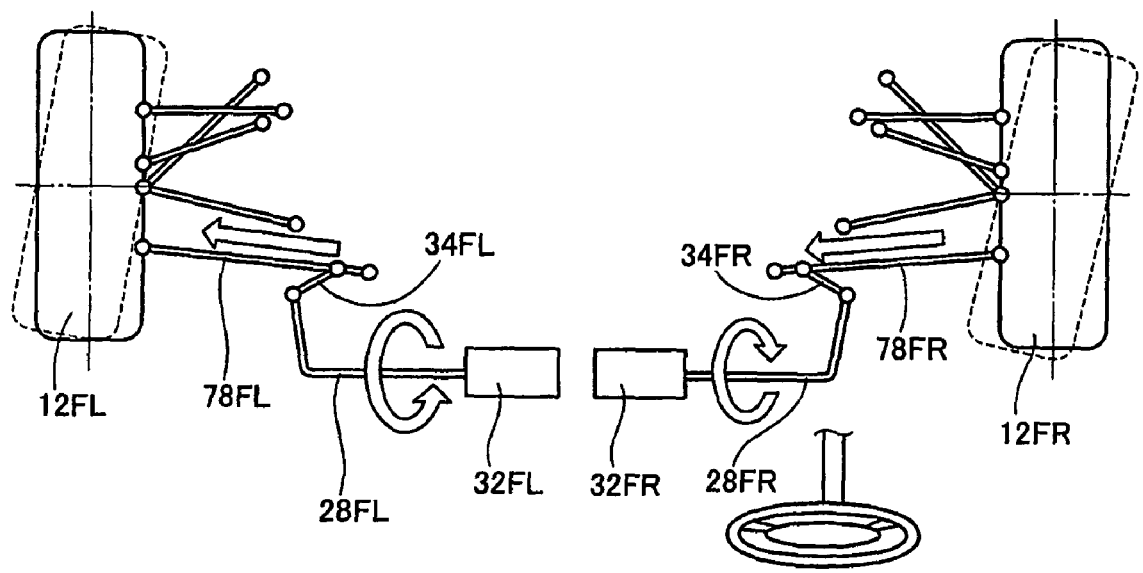
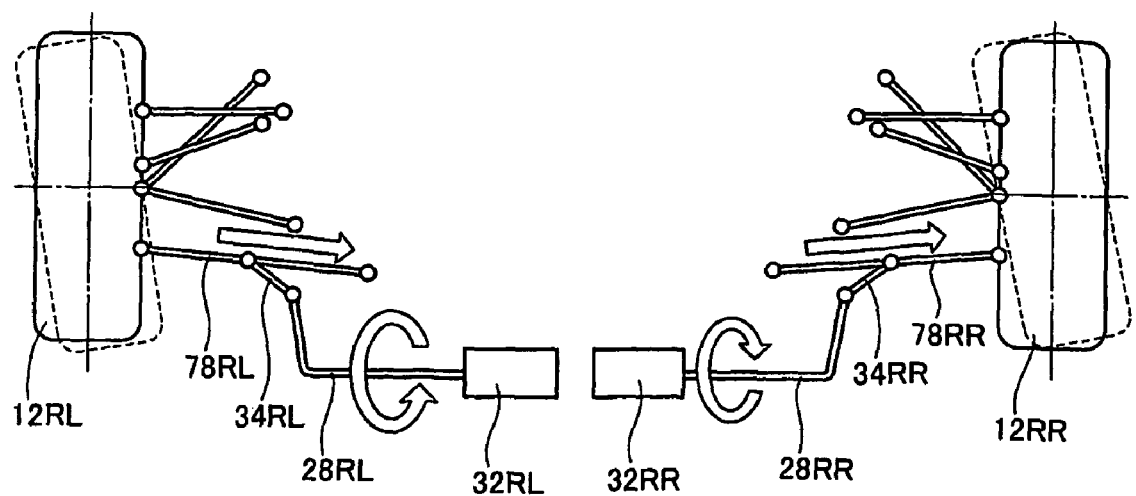

VEHICLE STABILIZER SYSTEM

TECHNICAL FIELD

The present invention relates in general to a vehicle stabilizer system that is to be installed in a vehicle, and more particularly to such a vehicle stabilizer system that is equipped with an actuator so as to be capable of changing a stabilizing force generated by a stabilizer bar of the stabilizer system.

BACKGROUND ART

There is known a vehicle stabilizer system for reducing roll of a vehicle body, by utilizing a stabilizing force that is dependent on a torsional reaction of a stabilizer bar. In recent years, as disclosed in JP-2002-518245A (publication of unexamined Japanese Patent Application laid open in 2002) and JP-2004-314947A (publication of unexamined Japanese Patent Application laid open in 2004), there has been proposed a stabilizer system equipped with an actuator so as to be capable of changing the stabilizing force. Such a stabilizer system (hereinafter referred to as "active stabilizer system" where appropriate) has been already put to practical use.

A suspension device installed in a vehicle is arranged to cause toe and camber angles of a wheel of the vehicle to be changed in response to a vertical displacement of the wheel relative to a body of the vehicle. It is common that the vehicle is designed such that the vehicle has an understeer tendency as its cornering characteristic as a result of the change in the toe and camber angles of the wheel. There may be a case where the active stabilizer system is used with a suspension device that is designed for its use with a traditional stabilizer system not equipped with an actuator (hereinafter referred to as "conventional passive stabilizer system" where appropriate) rather than with the active stabilizer system. In such a case, since the active stabilizer system is capable of more effectively restraining or reducing roll of the vehicle body than the conventional passive stabilizer system, the change in the toe and camber angles of the wheel is somewhat restrained thereby possibly making it impossible to obtain a desired cornering characteristic of the vehicle. This is merely one example of problems encountered in the active stabilizer system. That is, in the active stabilizer, there is still room for improvement increasing its practical value.

DISCLOSURE OF INVENTION

Object to be Solved by the Invention

The present invention was made in the light of the background art discussed above. It is therefore an object of the invention to provide a vehicle stabilizer system having a high serviceability in its practical use.

Measure for Achieving the Object

For achieving the above object, the essence of the present invention is that, in an active stabilizer system for a vehicle, namely, in a vehicle stabilizer system equipped with an actuator, a link rod interconnecting a stabilizer bar and a suspension arm is arranged to be inclined with respect to the suspension arm such that an angle defined by the link rod and the suspension arm is not 90°.

EFFECTS OF THE INVENTION

In the stabilizer system constructed according to the invention, it is possible to cause a component of a stabilizing force (generated by the stabilizer bar) to serve as an axial force acting on the suspension arm, so that toe and camber angles of a wheel of the vehicle can be suitably changed by utilizing compliance of a suspension device that includes the suspension arm. The suitable change in the toe and camber angles of the wheel makes it possible to improve, for example, a cornering characteristic of the vehicle and accordingly to permit the stabilizer system to have a high serviceability in its practical use.

MODES OF THE INVENTION

There will be described various modes of the invention deemed to contain claimable features for which protection is sought. Each of these modes of the invention is numbered like the appended claims and depends from the other mode or modes, where appropriate, for easier understanding of the technical features disclosed in the present specification. It is to be understood that the present invention is not limited to the technical features or any combinations thereof which will be described, and shall be constructed in the light of the following descriptions of the various modes and preferred embodiments of the invention. It is to be further understood that a plurality of elements or features included in any one of the following modes of the invention are not necessarily provided all together, and that the invention may be embodied with selected at least one of the elements or features described with respect to the same mode. It is to be still further understood that a plurality of elements or features included in any one of the following modes of the invention may be combined with at least one additional element or feature in the light of the following descriptions of the various modes and the preferred embodiments of the invention, and that the invention may be embodied with such a possible combination with respect to the same mode.

(1) A stabilizer system for a vehicle including a suspension arm interconnecting a wheel and a body of the vehicle, the stabilizer system comprising: (a) a stabilizer bar including (a-1) a torsion bar portion, and (a-2) an arm portion that extends from the torsion bar portion in a direction not parallel to the torsion bar portion; (b) an actuator configured to rotate the stabilizer bar about an axis of the torsion bar portion; and (c) a link rod interconnecting the suspension arm and one of opposite ends of the arm portion that is remote from the torsion bar portion, wherein the stabilizer bar generates a stabilizing force which is dependent on a reaction that is generated as a result of torsion of the torsion bar portion, and which forces the wheel and the body in a selected one of a direction toward each other and a direction away from each other, wherein the actuator allows the stabilizer bar to generate the stabilizing force whose magnitude is changeable by operation of the actuator, and wherein the link rod is inclined with respect to the suspension arm to which the link rod is connected, such that an angle defined by the link rod and the suspension arm is not 90°.

The stabilizer system defined in this mode (1) is an active stabilizer system, and is characterized in that the link rod interconnecting the stabilizer bar and the suspension arm is arranged to be inclined with respect to the suspension arm. In a conventional passive stabilizer system, it is designed that the stabilizing force acts exclusively as a force forcing the wheel and the vehicle body toward or away from each other, so that the link rod is perpendicular to the suspension arm without inclination of the link rod with respect to the suspension arm, for maximizing an efficiency with which the wheel and the vehicle body are forced toward or away from each other. In the present stabilizer system, since the link rod is inclined with respect to the suspension arm, it is possible to cause a component of the stabilizing force to serve as an axial force acting on the suspension arm, namely, to serve as a force acting in a direction connecting attached portions of the suspension arm at which the suspension arm is attached to the vehicle body and a wheel holder (such as axle carrier and knuckle), respectively, so that toe and camber angles of the wheel can be suitably changed by utilizing compliance of a suspension device including the suspension arm, with application of the axial force to the suspension arm. This arrangement facilitates the cornering characteristic of the vehicle to be suitably changed or modified by the stabilizing force.

(2) The stabilizer system according to mode (1), wherein the angle is not larger than 80°.

(3) The stabilizer system according to mode (1), wherein the angle is not larger than 70°.

(4) The stabilizer system according to mode (1), wherein the angle is not larger than 60°.

In the stabilizer system defined in each of modes (2)-(4), the angle defined by the link rod and the suspension arm, i.e., the angle of inclination of the link rod with respect to the suspension arm is limited to a preferable range. Where the angle is not larger than 80°, the axial force constituted by the component of the stabilizing force can be made more effective. The axial force can be increased with increase of the inclination angle, without the stabilizing force being changed. However, since the increase of the angle leads to reduction of a force causing pivot motion of the suspension arm, i.e., reduction of a force forcing the wheel and the vehicle body toward or away from each other, it is preferable to take account of a suitable balance between the axial force and the force forcing the wheel and the vehicle body, in determination of the inclination angle of the link rod.

(5) The stabilizer system according to any one of modes (1)-(4), wherein the stabilizer bar is provided for a front wheel as the wheel such that the stabilizing force generated by the stabilizer bar forces the front wheel and the body of the vehicle.

(6) The stabilizer system according to mode (5), wherein the link rod is inclined with respect to the suspension arm in a direction which causes an axial force as a component of the stabilizing force to act on the suspension arm in a toe-in direction when the stabilizing force forces the front wheel and the body in the direction toward each other, and which causes the axial force to act on the suspension arm in a toe-out direction when the stabilizing force forces the front wheel and the body in the direction away from each other, and wherein a toe angle of the front wheel is changeable depending on a direction in which the axial force acts on the suspension arm, such that front and rear portions of the front wheel are displaced inwardly and outwardly in a lateral direction of the vehicle, respectively, when the axial force acts on the suspension arm in the toe-in direction, and such that the front and rear portions of the front wheel are displaced outwardly and inwardly in the lateral direction of the vehicle, respectively, when the axial force acts on the suspension arm in the toe-out direction.

(7) The stabilizer system according to mode (5) or (6), wherein the link rod is inclined with respect to the suspension arm in a direction which causes an axial force as a component of the stabilizing force to act on the suspension arm in a negative-camber direction when the stabilizing force forces the front wheel and the body in the direction toward each other, and which causes the axial force to act on the suspension arm in a positive-camber direction when the stabilizing force forces the front wheel and the body in the direction away from each other, and wherein a camber angle of the front wheel is changeable depending on a direction in which the axial force acts on the suspension arm, such that upper and lower portions of the front wheel are displaced inwardly and outwardly in a lateral direction of the vehicle, respectively, when the axial force acts on the suspension arm in the negative-camber direction, and such that the upper and lower portions of the front wheel are displaced outwardly and inwardly in the lateral direction of the vehicle, respectively, when the axial force acts on the suspension arm in the positive-camber direction.

In the stabilizer system defined in each of modes (5)-(7), the stabilizing bar defined in mode (1) is provided for the front wheel. Among the three modes (5)-(7), each of modes (6) and (7) recites a feature regarding the direction in which the link rod is inclined with respect to the suspension arm, in the case of provision of the stabilizing bar for the front wheel. It is possible to increase an understeer tendency as a cornering characteristic of the vehicle, for example, by employing an arrangement in which the direction of the axial force acting on the suspension arm is made different depending on the direction of the stabilizing force, i.e., depending on whether the stabilizing force acts in a direction (hereinafter referred to as "bound direction" where appropriate) toward each other and another direction (hereinafter referred to as "rebound direction" where appropriate) away from each other. Therefore, even if the stabilizer system has a considerably high performance of reducing roll of the vehicle body, a satisfactory cornering characteristic of the vehicle can be obtained by the inclination of the link rod with respect to the suspension arm in the above-described suitable direction that is defined in each of modes (6) and (7). It is noted that the features recited in modes (6) and (7) can be combined to each other. In the stabilizer system defined in the combination of modes (6) and (7), the link rod is inclined with respect to the suspension arm in a direction which causes the axial force to act in a direction corresponding to the toe-in direction and the negative-camber direction when the stabilizing force forces the front wheel and the vehicle body in the direction toward each other, and which causes the axial force to act in a direction corresponding to the toe-out direction and the positive-chamber direction when the stabilizing force forces the front wheel and the vehicle body in the direction away from each other. In this arrangement, the toe and camber angles of the front wheel are changeable depending on the direction in which the axial fore acts on the suspension arm, such that the front and rear portions of the front wheel are displaced inwardly and outwardly, respectively, and the upper and lower portions of the front wheel are displaced inwardly and outwardly, respectively, when the stabilizing force forces the front wheel and the vehicle body in the direction toward each other, and such that front and rear portions of the front wheel are displaced outwardly and inwardly, respectively, and the upper and lower portions of the front wheel are displaced outwardly and inwardly, respectively, when the stabilizing force forces the front wheel and the vehicle body in the direction away from each other.

(8) The stabilizer system according to any one of modes (1)-(4), wherein the stabilizer bar is provided for a rear wheel as the wheel such that the stabilizing force generated by the stabilizer bar forces the rear wheel and the body of the vehicle.

(9) The stabilizer system according to mode (8), wherein the link rod is inclined with respect to the suspension arm in a direction which causes an axial force as a component of the stabilizing force to act on the suspension arm in a toe-out direction when the stabilizing force forces the rear wheel and the body in the direction toward each other, and which causes the axial force to act on the suspension arm in a toe-in direction when the stabilizing force forces the rear wheel and the body in the direction away from each other, and wherein a toe angle of the rear wheel is changeable depending on a direction in which the axial force acts on the suspension arm, such that front and rear portions of the rear wheel are displaced outwardly and inwardly in a lateral direction of the vehicle, respectively, when the axial force acts on the suspension arm in the toe-out direction, and such that the front and rear portions of the rear wheel are displaced inwardly and outwardly in the lateral direction of the vehicle, respectively, when the axial force acts on the suspension arm in the toe-in direction.

(10) The stabilizer system according to mode (8) or (9), wherein the link rod is inclined with respect to the suspension arm in a direction which causes an axial force as a component of the stabilizing force to act on the suspension arm in a positive-camber direction when the stabilizing force forces the rear wheel and the body in the direction toward each other, and which causes the axial force to act on the suspension arm in a negative-camber direction when the stabilizing force forces the rear wheel and the body in the direction away from each other, and wherein a camber angle of the rear wheel is changeable depending on a direction in which the axial force acts on the suspension arm, such that upper and lower portions of the rear wheel are displaced outwardly and inwardly in a lateral direction of the vehicle, respectively, when the axial force acts on the suspension arm in the positive-camber direction, and such that the upper and lower portions of the rear wheel are displaced inwardly and outwardly in the lateral direction of the vehicle, respectively, when the axial force acts on the suspension arm in the negative-camber direction.

In the stabilizer system defined in each of modes (8)-(10), the stabilizing bar defined in mode (1) is provided for the rear wheel. Among the three modes (8)-(10), each of modes (9) and (10) recites a feature regarding the direction in which the link rod is inclined with respect to the suspension arm, in the case of provision of the stabilizing bar for the rear wheel. It is possible to increase an understeer tendency as a cornering characteristic of the vehicle, for example, by employing an arrangement in which the direction of the axial force acting on the suspension arm is made different depending on the direction of the stabilizing force. It is noted that the features recited in modes (9) and (10) can be combined to each other. In the stabilizer system defined in the combination of modes (9) and (10), the toe and camber angles of the rear wheel are both changeable depending on the direction in which the axial fore acts on the suspension arm, as the toe and camber angles of the front wheel in the above-described stabilizer system defined in the combination of modes (6) and (7).

(11) The stabilizer system according to any one of modes (1)-(10), comprising: a pair of stabilizer bars each of which is provided by the stabilizer bar; a pair of actuators each of which is provided by the actuator; and a pair of link rods each of which is provided by the link rod, wherein the pair of link rods are connected to respective suspension arms each of which is provided by the suspension arm and interconnects a corresponding one of right and left wheels as the wheel and the body of the vehicle, and wherein the torsion bar portion of each of the pair of stabilizer bars is rotated, at one of axially opposite end portions thereof that is remote from the arm portion of the each of the pair of stabilizer bars, by a corresponding one of the pair of actuators.

(12) The stabilizer system according to mode (11), wherein the actuator includes a housing fixed to the body of the vehicle, an electric motor held in the housing, and a speed reducer held in the housing and reducing a speed of motion of the motor while transmitting the motion of the motor to the torsion bar portion of the stabilizer bar, and wherein the torsion bar portion of the stabilizer bar is connected to an output portion of the speed reducer.

(13) The stabilizer system according to mode (12), wherein the speed reducer includes a harmonic gear set.

The stabilizer system defined in each of modes (11)-(13) is an active stabilizer system of right/left independent type in which the pair of stabilizer bars and the pair of actuators are provided for the respective right and left wheels so that the stabilizing force acting on the right wheel and the body and the stabilizing force acting on the left wheel and the body are controllable independently of each other. In this stabilizer system of right/left independent type, by controlling the pair of actuators, it is possible to carry out roll reduction control and pitch reduction control in active manners and also body-height adjustment control.

(14) The stabilizer system according to any one of modes (1)-(10), comprising a pair of link rods each of which is provided by the link rod, the link rods being connected to respective suspension arms each of which is provided by the suspension arm and interconnects a corresponding one of right and left wheels as the wheel and the body of the vehicle, wherein the stabilizer bar includes a pair of arm portions each of which is provided by the arm portion, wherein the pair of arm portions extend from axially opposite ends of the torsion bar portion to the respective link rods, and wherein the torsion bar portion extends in a lateral direction of the vehicle, and is rotated, at an axially intermediate portion thereof, by the actuator.

(15) The stabilizer system according to mode (14), wherein the actuator includes a housing fixed to the body of the vehicle, an electric motor held in the housing, and a speed reducer held in the housing and reducing a speed of motion of the motor while transmitting the motion of the motor to the torsion bar portion of the stabilizer bar, and wherein the torsion bar portion of the stabilizer bar is connected, at the axially intermediate portion thereof, to an output portion of the speed reducer.

(16) The stabilizer system according to mode (15), wherein the speed reducer includes a harmonic gear set.

The stabilizer system defined in each of modes (14)-(16) is an active stabilizer system of right/left in-phase rotation type in which the pair of arm portions extending from the respective opposite ends of the torsion bar portion and provided for the respective right and left wheels are rotatable in the same direction by the actuator. In this stabilizer system of right/left in-phase type, the active pitch reduction control and the body-height adjustment control can be carried out, although the active roll reduction control cannot be carried out.

(17) The stabilizer system according to any one of modes (1)-(10), comprising: a pair of stabilizer bars each of which is provided by the stabilizer bar; and a pair of link rods each of which is provided by the link rod, wherein the link rods are connected to respective suspension arms each of which is provided by the suspension arm and interconnects a corresponding one of right and left wheels as the wheel and the body of the vehicle, wherein the torsion bar portion of one of the pair of stabilizer bars and the torsion bar portion of the other of the pair of stabilizer bars extend in a lateral direction of the vehicle, wherein the torsion bar portion of the one of the pair of stabilizer bars has an end portion that is remote from the arm portion of the one of the pair of stabilizer bars, while the torsion bar portion of the other of the pair of stabilizer bars has an end portion that is remote from the arm portion of the other of the pair of stabilizer bars, such that the end portions of the torsion bar portions of the respective stabilizer bars are opposed to each other, and wherein the torsion bar portions of the respective stabilizer bars are rotated, at the end portions thereof, relative to each other by the actuator.

(18) The stabilizer system according to mode (17), wherein the actuator includes a housing, an electric motor held in the housing, and a speed reducer held in the housing and reducing a speed of motion of the motor while transmitting the motion of the motor to the torsion bar portion of the other of the pair of stabilizer bars, and wherein the torsion bar portion of the one of the pair of stabilizer bars is connected, at the end portion thereof, to the housing, while the torsion bar portion of the other of the pair of stabilizer bars is connected, at the end portion thereof, to an output portion of the speed reducer.

(19) The stabilizer system according to mode (18), wherein the speed reducer includes a harmonic gear set.

The stabilizer system defined in each of modes (17)-(19) is an active stabilizer system of right/left inverted-phase rotation type in which the torsion bar portions of the respective stabilizer bars provided for the respective right and left wheels are rotatable in respective opposite directions by the actuator. In this stabilizer system of right/left inverted-phase rotation type, the active roll reduction control can be carried out, although the active pitch reduction control and the body-height adjustment control can not be carried out.

BRIEF DESCRIPTION OF DRAWINGS

The above and other objects, features, advantages and technical and industrial significance of the present invention will be better understood by reading the following detailed description of presently preferred embodiments of the invention, when considered in connection with the accompanying drawings, in which:

FIG. 7 is a view showing a direction of a stabilizing force generated by each stabilizer device and a change in a toe angle of each wheel during a left turn of the vehicle;

BEST MODE FOR CARRYING OUT THE INVENTION

There will be described embodiments of the present invention, by reference to the accompanying drawings. It is to be understood that the present invention is not limited to the following embodiments, and may be otherwise embodied with various changes and modifications, such as those described in the foregoing "MODES OF THE INVENTION", which may occur to those skilled in the art.

(A) First Embodiment

[Construction and Function of Stabilizer System]

Figure 1:
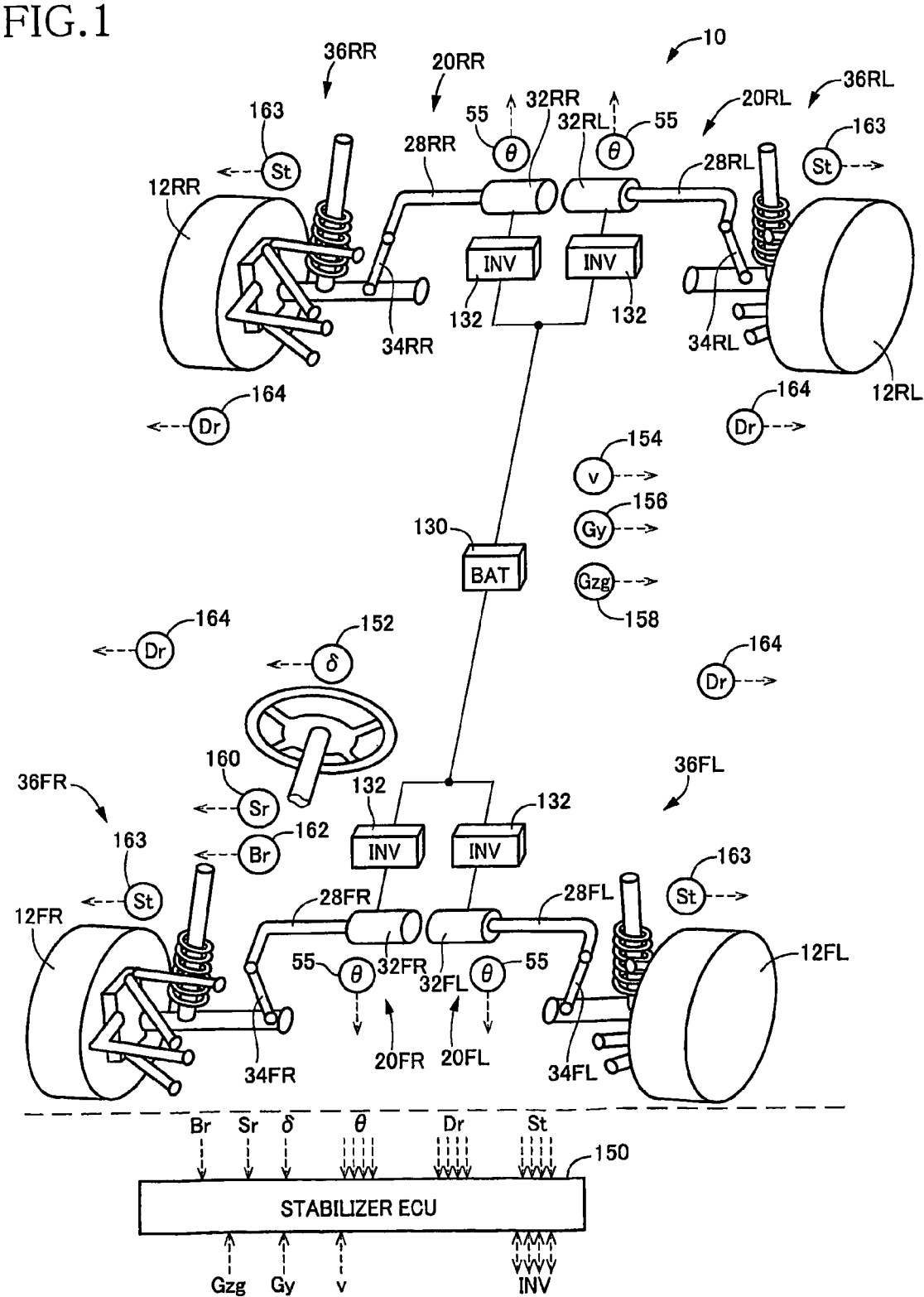
FIG. 1 is a view showing an overall construction of a stabilizer system according to a first embodiment of the invention.

FIG. 1 schematically shows a vehicle stabilizer system 10 constructed according to a first embodiment of the invention. The stabilizer system 10 includes four stabilizer devices 20 provided for respective four wheels (i.e., front right, front left, rear right and rear left wheels) 12. Each of the stabilizer devices 20 includes a stabilizer bar 28, an actuator 32 operable to rotate the stabilizer bar 28, and a link rod 34. In a vehicle equipped with the present stabilizer system 10, four suspension devices 36 are provided for the respective four wheels, independently of each other. The stabilizer bar 28 is connected at one of its opposite end portions to the corresponding suspension device 36 via the link rod 34, and is connected at the other end portions to the corresponding actuator 32. As is apparent from FIG. 1, the suspension device 36, stabilizer device 20 and stabilizer bar 28 are provided for each of the four wheels of the vehicle. In the following description, each of the suspension device 36, stabilizer device 20, and stabilizer bar 28 is referred together with one of reference signs FR, FL, RR, RL indicative of the respective front right, front left, rear right and rear left wheels, where it should be clarified which one of the four wheels the referred device or component corresponds to.

Figure 2:
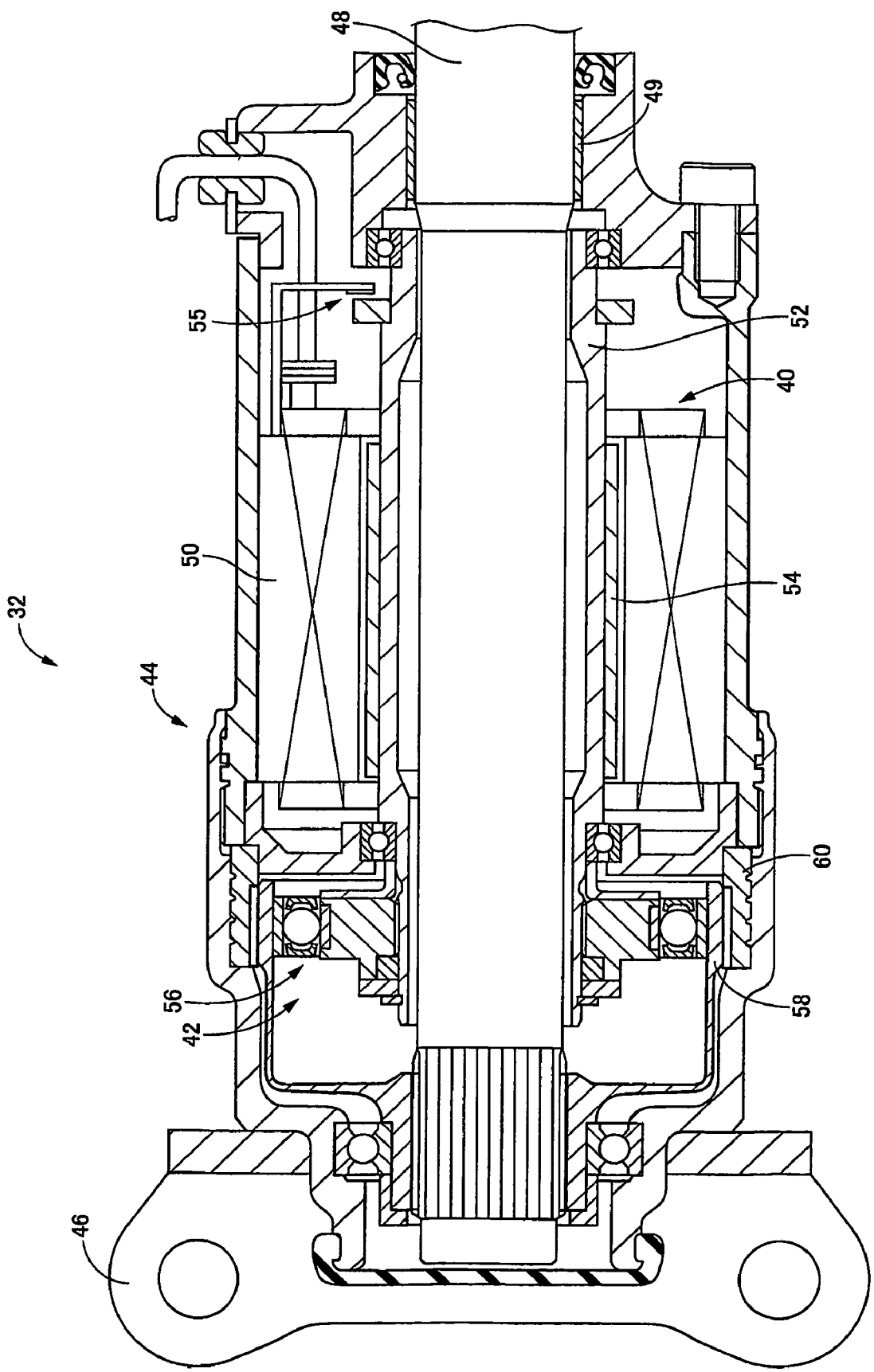
FIG. 2 is a cross sectional view of an actuator as a component of a stabilizer device of the first embodiment of the invention.

As shown in FIG. 2, the actuator 32 includes an electric motor 40 as a drive source, and a speed reducer 42 arranged to reduce a rotational speed of the electric motor 40 while outputting a torque or rotational force (hereinafter referred to as "motor force" where appropriate) of the electric motor 40. The electric motor 40 and the speed reducer 42 are disposed within a housing 44 of the actuator 32. The housing 44 is fixedly attached to a body of the vehicle through an attachment member 46 that is fixed to an end portion of the housing 44. An output shaft 48 is arranged to extend throughout the housing 44 and project out from another end portion of the housing 44. The output shaft 48 serves as an output portion of the actuator 32, and is supported by the housing 44 such that the output shaft 48 is rotatable relative to the housing 44 and axially unmovable relative to the housing 44. The output shaft 48 is connected, at one of its axially opposite end portions that is located within the housing 44, to the speed reducer 42, so as to serve also as an output portion of the speed reducer 42. A bearing bushing 49 is provided to support an axially intermediate portion of the output shaft 48, so that the output shaft 48 is rotatably held by the housing 44 through the bearing bushing 49.

The electric motor 40 includes a plurality of coils 50 that are fixedly disposed on a circumference along an inner surface of a circumferential wall of the housing 44, a motor shaft 52 that is provided by a hollow member rotatably held by the housing 44, and a permanent magnet 54 which is fixed to an outer circumferential surface of the motor shaft 52 and which is radially opposed to the coils 50. The electric motor 40 is provided by a three-phase DC brushless motor, so that each of the coils 50 serves as a stator while the permanent magnet 54 serves as a rotor. An angular position sensor 55 is provided in the housing 44, so as to detect an angular position of the motor shaft 52, i.e., an angular position of the electric motor 40. The angular position sensor 55 is constituted principally by a rotary encoder, and outputs a signal that is used in controlling the actuator 32, namely, controlling the stabilizer device 20.

The speed reducer 42 is provided by a harmonic gear set (which is also called "harmonic drive (trademark)" or "strain wave gearing"), and includes a wave generator 56, a flexible gear (flexspline) 58 and a ring gear (circular spline) 60. The wave generator 56 includes an elliptic cam and a ball bearing fitted on an outer circumferential surface of the elliptic cam, and is fixed to an end portion of the motor shaft 52. The flexible gear 58 is provided by a cup-shaped member having a circumferential wall portion that is elastically deformable, and a plurality of teeth 59 (see FIGS. 11A and 11B) formed on its outer circumferential surface. The teeth 59 are located in one of axially opposite end portions of the flexible gear 58 that is close to an opening end of the cup-shaped flexible gear 58. The flexible gear 58 is connected to the above-described one of the axially opposite end portions of the output shaft 48, so as to be held by the output shaft 48. Described more specifically, the output shaft 48 serving as the output portion of the speed reducer 42 is arranged to extend throughout the motor shaft 52 provided by the hollow member. The above-described one of the axially opposite end portions of the output shaft 48 projects out from the motor shaft 52, and is serrated in its outer circumferential surface so as to be held in engagement with an inner circumferential surface of a hole formed through a bottom wall of the cup-shaped flexible gear 58 that is also serrated. Owing to the serration engagement, the output shaft 48 and the flexible gear 58 are connected to each other, and are unrotatable and axially unmovable relative to each other. The ring gear 60 is provided by a ring member fixed to the housing 44, and has a plurality of teeth 61 (see FIGS. 11A and 11B) formed on its inner circumferential surface. The number of teeth 61 of the ring gear 60 is slightly larger than the number of teeth 59 of the flexible gear 58, for example, by two. The flexible gear 58 is fitted at its circumferential wall portion on the wave generator 56, and is elastically deformed to have an elliptic shape. The flexible gear 58 meshes, at two portions thereof that lie substantially on a long axis of the elliptic shape, with the ring gear 60, while not meshing at the other portions thereof with the ring gear 60. In the thus constructed speed reducer 42, while the wave generator 56 is rotated by a single rotation (by 360°), namely, while the motor shaft 52 of the electric motor 40 is rotated by a single rotation, the flexible gear 58 and the ring gear 60 are rotated relative to each other by an amount corresponding to a difference therebetween with respect to the number of teeth.

Figure 3:
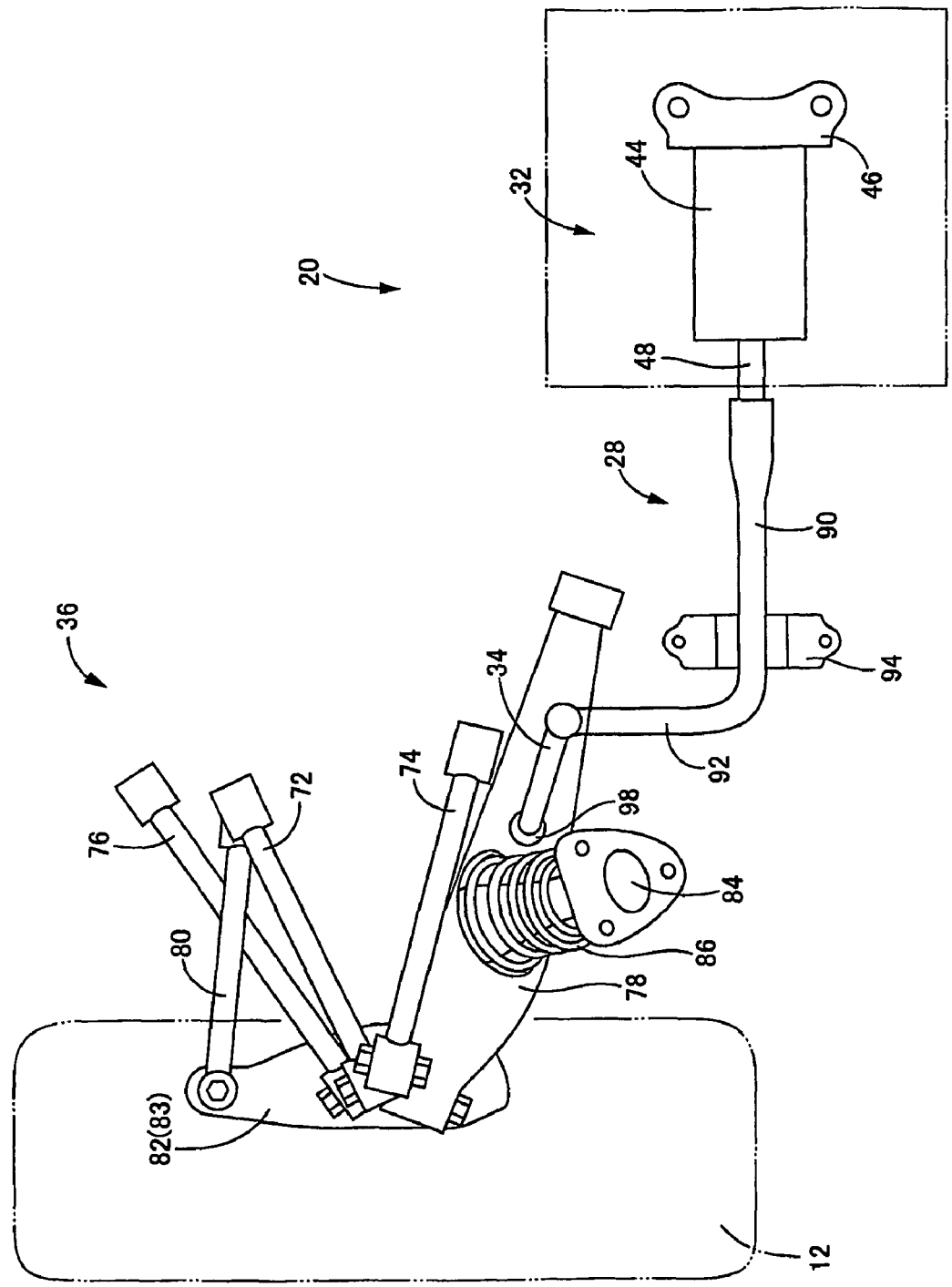
FIG. 3 is a view of the stabilizer device of the first embodiment that is connected to a suspension device, as seen from an upper side of a vehicle.
Figure 4:
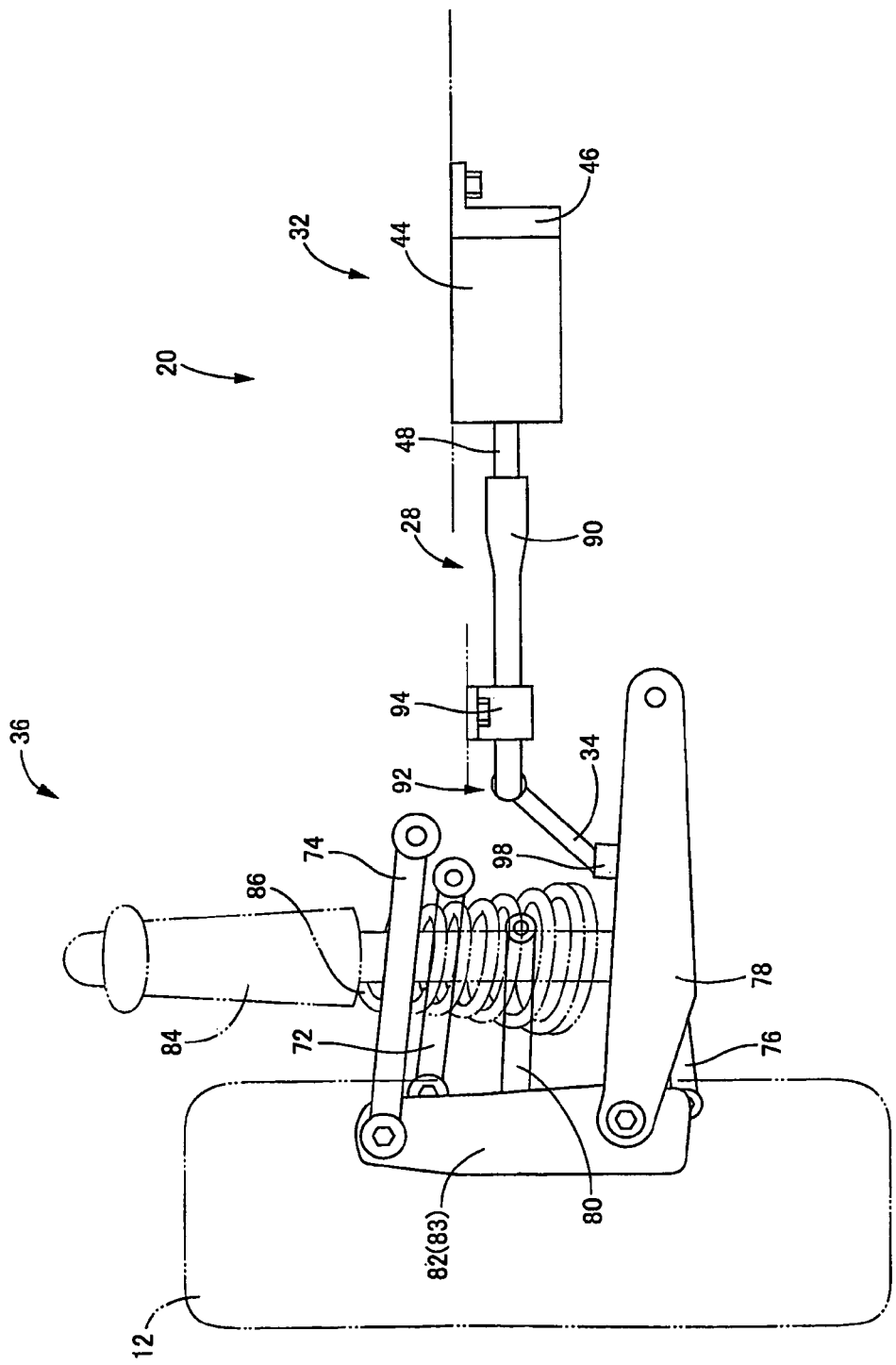
FIG. 4 is a view of the stabilizer device of the first embodiment that is connected to the suspension device, as seen from a rear side of the vehicle.

Each suspension device 36 of independent type is provided by a multi-link suspension as is apparent from FIGS. 3 and 4, which are views as seen from an upper side and a rear side of the vehicle, respectively. The suspension device 36 will be described by reference to FIGS. 3 and 4. Although the front suspension devices 36FR, 36FL provided for the front wheels 12FR, 12FL as steered wheels and the rear suspension devices 36RR, 36RL provided for the rear wheels 12RR, 12RL as non-steered wheels are slightly different in construction, the description of the suspension device 36 will be made by reference to the same drawing figures, for simplifying the description.

The suspension device 36 is equipped with an arm assembly that includes a first upper arm 72, a second upper arm 74, a first lower arm 76, a second lower arm 78 and a toe control arm 80. Each of the five arms 72, 74, 76, 78, 80 is connected at one of its longitudinal end portions to the vehicle body, pivotably relative to the vehicle body. Meanwhile, each of the five arms 72, 74, 76, 78, 80 of each of the rear suspension devices 36RR, 36RL is connected at the other end portion to an axle carrier 82, and each of the five arms 72, 74, 76, 78, 80 of each of the front suspension devices 36FR, 36FL is connected at the other end portion to a knuckle 83. Each of the rear wheels 12RR, 12RL is held by the axle carrier 82 so as to be rotatable about its axle, while each of the front wheels 12FR, 12FL is held by the knuckle 83 so as to be rotatable about its axle and steerable. When each wheel 12 and the vehicle body are vertically displaced toward or away from each other, each of the five arms 72, 74, 76, 78, 80 is pivoted about the above-described end portion (i.e., vehicle-body-side end portion), whereby the above-described other end portion (wheel-side end portion) of the each of the five arms 72, 74, 76, 78, 80 is vertically displaced relative to the vehicle body. The second lower arm 78 serving as a suspension arm is connected to a portion of the axle carrier 82 or the knuckle 83 that is located on the rear and lower side of an axle holding portion of the axle carrier 82 or the knuckle 83 that holds the axle of the wheel 12. Further, each axle 82 or knuckle 83 is pressed or pulled in its axial direction by the toe control arm 80 that is connected to the axle 82 or knuckle 83, when the corresponding wheel 12 and the vehicle body are vertically displaced toward or away from each other. The suspension device 36 is further equipped with a shock absorber 84 and a suspension spring 86 that are interposed between the second lower arm 78 and a mount portion of a tire housing. That is, the suspension device 36 is arranged to generate a damping force absorbing vibrations caused by the displacement of the wheel 12 and the vehicle body toward and away from each other, while elastically interconnecting the wheel 12 and the vehicle body.

The stabilizer bar 28 of the stabilizer device 20 includes a torsion bar portion 90 which extends substantially in a width or lateral direction of the vehicle, and an arm portion 92 which is contiguous to the torsion bar portion 90 and which extends in a direction not parallel to the torsion bar portion 90, e.g., substantially in a forward direction of the vehicle. The torsion bar portion 90 of the stabilizer bar 28 is rotatably held, at its portion that is close to the arm portion 92, by a retainer 94 that is fixed to the vehicle body. The actuator 32 is fixed through the above-described attachment 46 to a widthwise central portion of the vehicle body. The torsion bar portion 90 is connected at one of its longitudinal end portions (that is located an inner side of the other of the longitudinal end portions in the width direction of the vehicle) to the longitudinal end portion of the output shaft 48 that projects out from the housing 44. Since the torsion bar portion 90 and the output shaft 48 are connected to each other through a so-called serration engagement, the torsion bar portion 90 and the output shaft 48 are not rotatable relative to each other. Meanwhile, the arm portion 92 is connected at one of its longitudinal end portions (that is remote from the torsion bar portion 90) to the second lower arm 78 via the link rod 34. A link-rod connection portion 98 is provided on the second lower arm 78 of the suspension device 36, so that the link rod 34 is rockably connected at its longitudinally opposite end portions to the link-rod connecting portion 98 and the arm portion 92 of the stabilizer bar 28, respectively.

When the output shaft 48 is rotated by rotation of the electric motor 40, the torsion bar portion 90 of the stabilizer bar 28 is twisted. As a result of the twisting deformation or torsion of the torsion bar portion 90, a reaction is generated and then transmitted to the second lower arm 78 via the arm portion 92, link rod 34 and link-rod connection portion 98. This reaction acts as a stabilizing force forcing upwardly or downwardly the second lower arm 98 toward or away from the vehicle body, namely, forcing the wheel 12 and the vehicle body toward each other or away from each other. Thus, in the stabilizer device 24, a magnitude of the generated stabilizing force is changeable by controlling operation of the actuator 32.

To the electric motor 40 included in the actuator 32, an electric power is supplied from a power source in the form of a buttery 130, as shown in FIG. 1. The present stabilizer system 10 includes four inverters 132 provided for the respective stabilizer devices 20. Each of the inverters 132 serving as drive circuits is disposed between the buttery 130 and a corresponding one of the stabilizer devices 20, so that the electric power is supplied to the electric motor 40 of each of the stabilizer devices 20 via a corresponding one of the corresponding inverters 132. Since the electric motor 40 is driven by a constant voltage, an amount of the electric power supplied to the electric motor 40 is changed by changing an amount of electric current supplied to the electric motor 40. That is, the force generated by the electric motor 40 is dependent on the amount of the supplied electric current, which can be changed, for example, by a PWM (pulse width modulation) control performed by the inverter 132. In the PWM control, the inverter 132 is arranged to suitably control a duty ratio, i.e., a ratio of pulse ON time to a sum of the pulse ON time and pulse OFF time.

The actuators 32 of the respective stabilizer devices 20 are controlled by a stabilizer electronic control unit (stabilizer ECU) 150, as shown in FIG. 1, which is constituted principally by a computer including CPU, ROM and RAM. To the stabilizer ECU 150, there is connected, in addition to the angular position sensors 55, an operating angle sensor 152 arranged to detect an operating angle of a steering wheel as a steering operating member, i.e., an operating amount (as a kind of an steering amount) of the steering wheel, a running speed sensor 154 arranged to detect a running speed of the vehicle, a lateral acceleration sensor 156 arranged to detect an actual acceleration of the vehicle as measured in the lateral direction of the vehicle, a longitudinal acceleration sensor 158 arranged to detect an actual acceleration of the vehicle as measured in the longitudinal direction of the vehicle, a throttle sensor 160 arranged to detect an opening angle of a throttle valve, a brake pressure sensor 162 arranged to detect a brake pressure, a total of four stroke sensors 163 each arranged to detect a distance between the corresponding wheel 12 and the vehicle body, and a total of four door sensors 164 each arranged to detect opening and closing of a corresponding one of doors. Further, the stabilizer ECU 150 is connected to the inverters 132, so that each of the respective stabilizer devices 20 can be controlled by controlling a corresponding one of the inverters 132. The ROM included in the computer constituting the stabilizer ECU 150 stores various control programs for executing routines as described below and also various data related to the control of each stabilizer device 20. In FIG. 1, each of the angular position sensors 55 is represented by "$\theta$", the operating angle sensor 152 is represented by "$\delta$", the running speed sensor 154 is represented by "v", the lateral acceleration sensor 156 is represented by "Gy", the longitudinal acceleration sensor 158 is represented by "Gzg", the throttle sensor 160 is represented by "Sr", the brake pressure sensor 162 is represented by "Br", each of the stroke sensors 163 is represented by "St", and each of the door sensors 164 is represented by "Dr".

In the present stabilizer system 10, the four stabilizer devices 20 are controllable independently of each other. That is, the stabilizing forces produced by the respective stabilizer devices 20 are controlled independently of each other, for executing a roll reduction control for reducing roll of the vehicle body, a pitch reduction control for reducing pitch of the vehicle body, and a body-height adjustment control for adjusting a height of the vehicle body from a road surface.

Described specifically, the roll reduction control is executed upon turning of the vehicle, to restrain or reduce the roll of the vehicle body, by controlling each of the stabilizer devices 20 provided for inside wheels 12 (having a smaller turning radius) to cause the stabilizing force to force the corresponding wheel 12 and the vehicle body in a bound direction, i.e., a direction toward each other, while controlling each of the stabilizer devices 20 provided for outside wheels 12 (having a larger turning radius) to cause the stabilizing force to force the corresponding wheel 12 and the vehicle body in a rebound direction, i.e., a direction away from each other, in response to a roll moment resulting from the turning of the vehicle. The pitch reduction control is executed upon braking (deceleration) of the vehicle, to restrain or reduce a front-end dive of the vehicle body, by controlling each of the front stabilizer devices 20FR, 20FL provided for the front wheels 12FR, 12FL to cause the stabilizing force to force the corresponding wheel 12 and the vehicle body in the rebound direction, while controlling each of the rear stabilizer devices 20RR, 20RL provided for the rear wheels 12RR, 12RL to cause the stabilizing force to force the corresponding wheel 12 and the vehicle body in the bound direction, in response to a pitch moment resulting from the braking (deceleration) of the vehicle. The pitch reduction control is executed also upon acceleration of the vehicle, to restrain or reduce a rear-end squat of the vehicle body, by controlling each of the rear stabilizer devices 20RR, 20RL provided for the rear wheels 12RR, 12RL to cause the stabilizing force to force the corresponding wheel 12 and the vehicle body in the rebound direction, while controlling each of the front stabilizer devices 20FR, 20FL provided for the front wheels 12FR, 12FL to cause the stabilizing force to force the corresponding wheel 12 and the vehicle body in the bound direction, in response to a pitch moment resulting from the acceleration of the vehicle. The body-height adjustment control is executed in response to change in the height of the vehicle body caused by increase and reduction in weight of luggage loaded on the vehicle and weight of passenger riding on the vehicle, to keep the vehicle body height substantially in a predetermined level, by controlling each of the stabilizer devices 20 provided for the respective wheels 12 to cause the stabilizing force to force the corresponding wheel 12 and the vehicle body in such a direction that reduces the change in the vehicle body height.

[Relationship Between Suspension Geometry and Stabilizing Force]

Each of the suspension devices 36 constructed as described above causes a toe angle and a camber angle of the corresponding wheel 12 to be changed owing to motions of the respective five arms 72, 74, 76, 68, 80 resulting from the displacement of the corresponding wheel 12 toward or away from the vehicle body. Described specifically, when each wheel 12 and the vehicle body are displaced away from each other, namely, each wheel 12 is rebounded, the toe angle of each of the front wheels 12FR, 12FL is changed in an inward direction thereof (that causes front and rear portions of the wheel to be displaced inwardly and outwardly in the lateral direction of the vehicle, respectively), the camber angle of each of the front wheels 12FR, 12FL is changed in a negative direction thereof (that causes upper and lower portions of the wheel to be displaced inwardly and outwardly in the lateral direction of the vehicle, respectively), the toe angle of each of the rear wheels 12RR, 12RL is changed in an outward direction thereof (that causes the front and rear portions of the wheel to be displaced outwardly and inwardly in the lateral direction of the vehicle, respectively), and the camber angle of each of the rear wheels 12RR, 12RL is changed in a positive direction thereof (that causes the upper and lower portions of the wheel to be displaced outwardly and inwardly in the lateral direction of the vehicle, respectively). On the other hand, when each wheel 12 and the vehicle body are displaced toward each other, namely, each wheel 12 is bounded, the toe angle of each of the front wheels 12FR, 12FL is changed in the outward direction thereof, the camber angle of each of the front wheels 12FR, 12FL is changed in the positive direction thereof, the toe angle of each of the rear wheels 12RR, 12RL is changed in the inward direction thereof, and the camber angle of each of the rear wheels 12RR, 12RL is changed in the negative direction thereof.

Since each of the suspension devices 36 has a suspension geometry as described above, when the vehicle turns right or left, the toe angle and the camber angle of the inside front wheel 12 (that is rebounded) are changed in the inward direction and the negative direction, respectively, the toe angle and the camber angle of the inside rear wheel 12 (that is rebounded) are changed in the outward direction and the positive direction, respectively, the toe angle and the camber angle of the outside front wheel 12 (that is bounded) are changed in the outward direction and the positive direction, respectively, and the toe angle and the camber angle of the outside rear wheel 12 (that is bounded) are changed in the inward direction and the negative direction, respectively. Owing to the changes in the toe and camber angles of each wheel 12, the vehicle is given an understeer tendency as its cornering characteristic.

Figure 5:
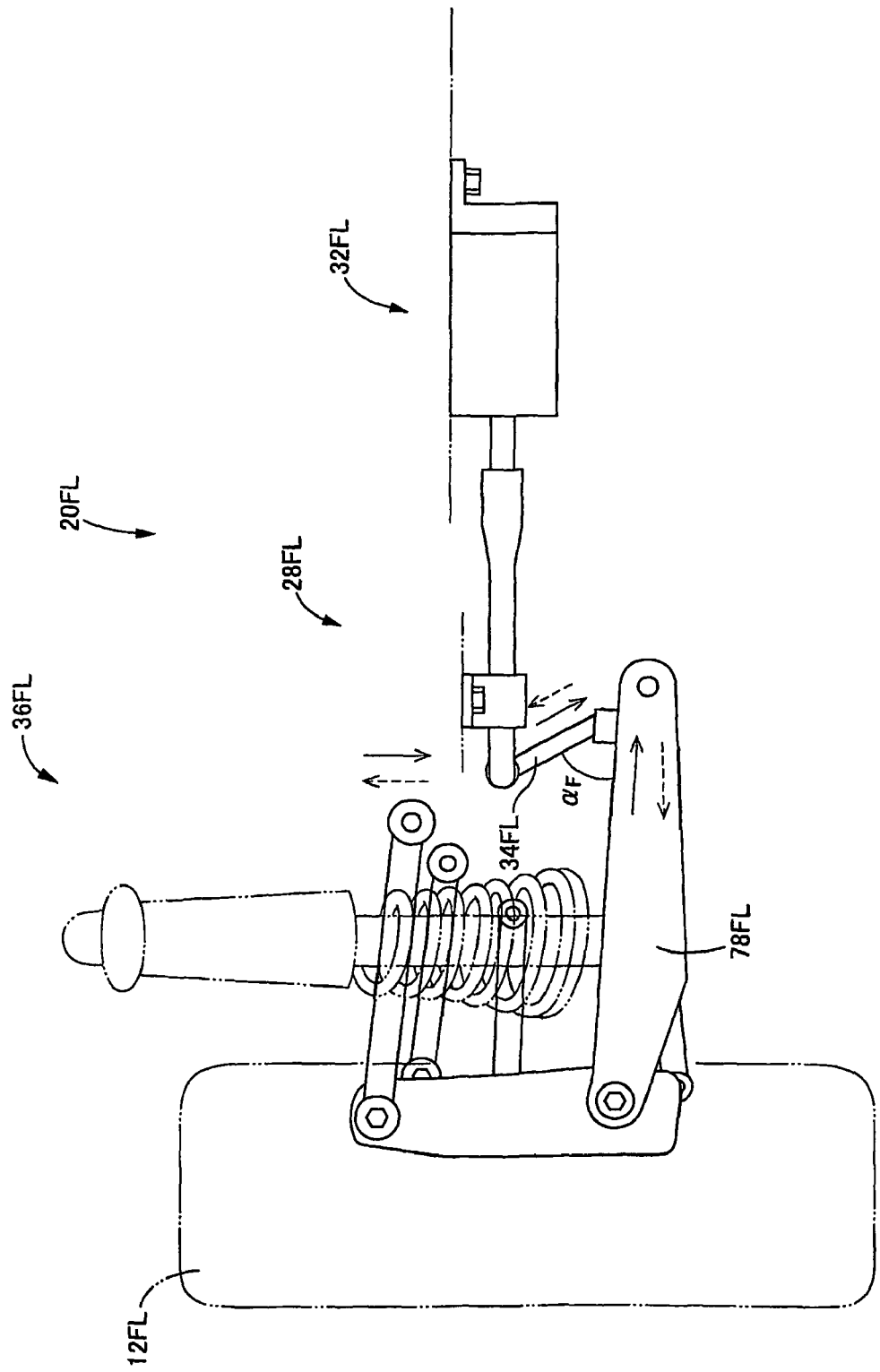
FIG. 5 is a view of the stabilizer device of the first embodiment provided for a front left wheel of the vehicle, as seen from the rear side of the vehicle.
Figure 6:
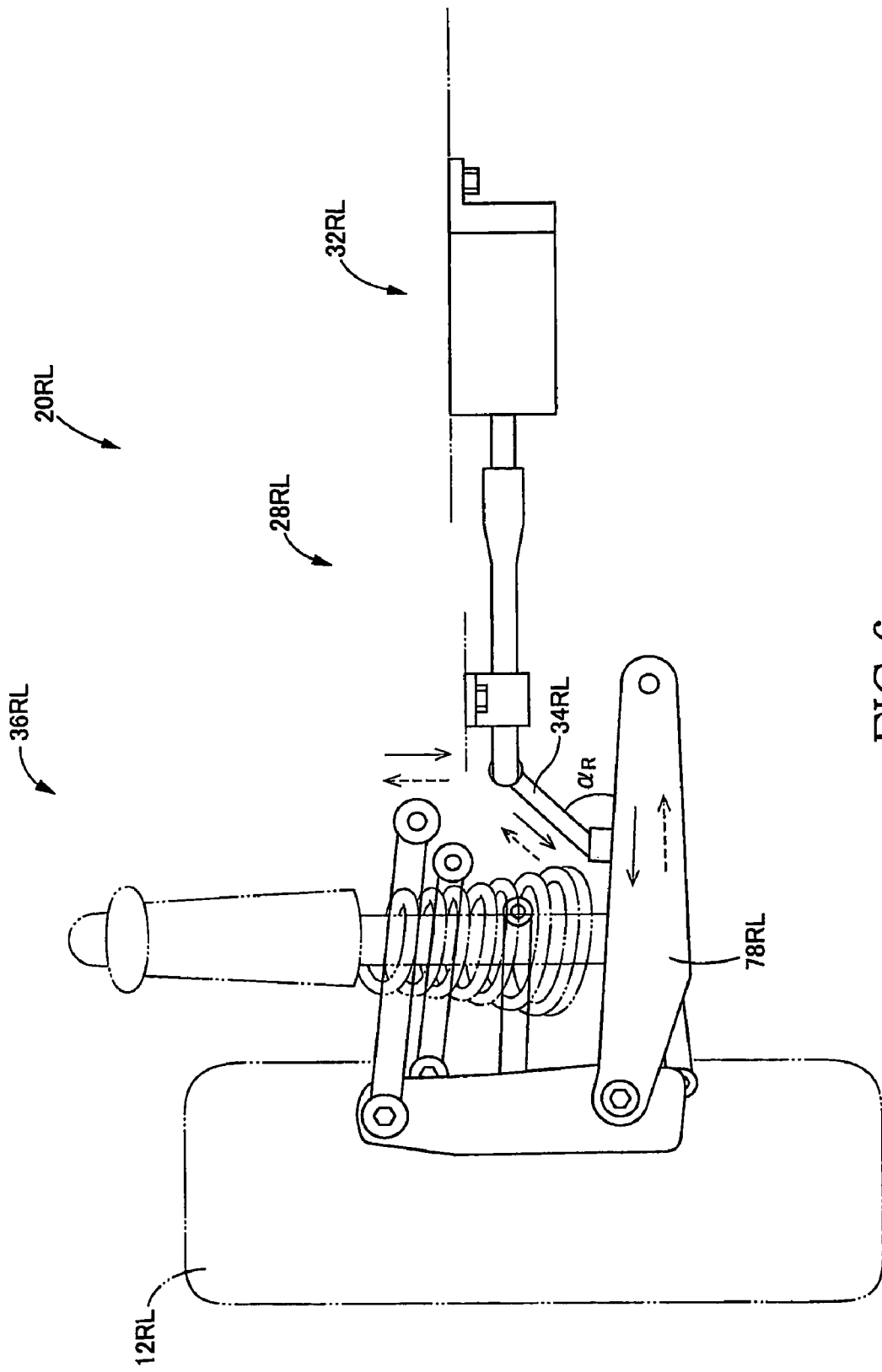
FIG. 6 is a view of the stabilizer device of the first embodiment provided for a rear left wheel of the vehicle, as seen from the rear side of the vehicle.

However, in the vehicle equipped with the present stabilizer system 10, since the roll reduction control is executed, as described above, for stabilizing posture of the vehicle body during turning of the vehicle, each of the stabilizer devices 20 is controlled to restrain displacement of the corresponding wheel 12 and the vehicle body toward or away from each other, which displacement results from turning of the vehicle. The execution of the roll reduction control leads to reduction in the understeer tendency as the cornering characteristic that is dependent on the above-described suspension geometry. In view of this, the present stabilizer system 10 is arranged such that the stabilizing force acts on each of the suspension devices 36 in such a manner that restrains the reduction in the understeer tendency or increases the understeer tendency. Specifically, the link rod 34 of each of the stabilizer devices 20 that is connected to the second lower arm 78 of each of the suspension devices 36 is inclined with respect to the second lower arm 78, in other words, an angle $\alpha$ defined by the link rod 34 and the second lower arm 78 serving as the suspension arm is not substantially 90°. Described more specifically, each of the link rods 34FR, 34FL is connected at its suspension-arm connection end portion to a corresponding one of the second lower arms 78FR, 78FL of the front suspension devices 36FR, 36FL with inclination of each link rod 34 with respect to the corresponding second lower arm 78 such that the suspension-arm connection end portion of each link rod 34 is located on inside of another end portion of each link rod 34 in the lateral direction of the vehicle, as shown in FIG. 5 that is a view of the stabilizer device 20 provided for the front left wheel 12FL. Meanwhile, each of the link rods 34RR, 34RL is connected at its suspension-arm connection end portion to a corresponding one of the second lower arms 78RR, 78RL of the rear suspension devices 36RR, 36RL with inclination of each link rod 34 with respect to the corresponding second lower arm 78 such that the suspension-arm connection end portion of each link rod 34 is located on outside of another end portion of each link rod 34 in the lateral direction of the vehicle, as shown in FIG. 6 that is a view of the stabilizer device 20 provided for the rear left wheel 12RL. In the present stabilizer system 10, the angle $\alpha_F$ defined by the link rod 34 and the second lower arm 78 of each of the front suspension devices 36FR, 36FL is about 58°, while angle $\alpha_R$ defined by the link rod 34 and the second lower arm 78 of each of the rear suspension devices 36RR, 36RL is also about 58°.

Since the link rod 34 is inclined as described above, a part of the stabilizing force produced by the stabilizer device 20 acts on the second lower arm 78 as the suspension arm in an axial direction of the second lower arm 78, namely, an axial force as a component of the stabilizing force acts on the second lower arm 78. Described specifically, in each of the front stabilizer devices 20FR, 20FL, as shown in FIG. 5, when the stabilizing force produced by each of the front stabilizer devices 20FR, 20FL acts in the rebound direction, the axial force acts on a corresponding one of the second lower arms 78FR, 78FL of the front suspension devices 36FR, 36FL inwardly in the lateral direction of the vehicle, as indicated by arrow of solid line. When the stabilizing force produced by each of the front stabilizer devices 20FR, 20FL acts in the bound direction, the axial force acts on a corresponding one of the second lower arms 78FR, 78FL outwardly in the lateral direction of the vehicle, as indicated by arrow of broken line. On the other hand, in each of the rear stabilizer devices 20RR, 20RL, as shown in FIG. 6, when the stabilizing force produced by each of the rear stabilizer devices 20RR, 20RL acts in the rebound direction, the axial force acts on a corresponding one of the second lower arms 78RR, 78RL of the rear suspension devices 36RR, 36RL outwardly in the lateral direction of the vehicle, as indicated by arrow of solid line. When the stabilizing force produced by each of the rear stabilizer devices 20RR, 20RL acts in the bound direction, the axial force acts on a corresponding one of the second lower arms 78RR, 78RL inwardly in the lateral direction of the vehicle, as indicated by arrow of broken line.

Figure 8A:
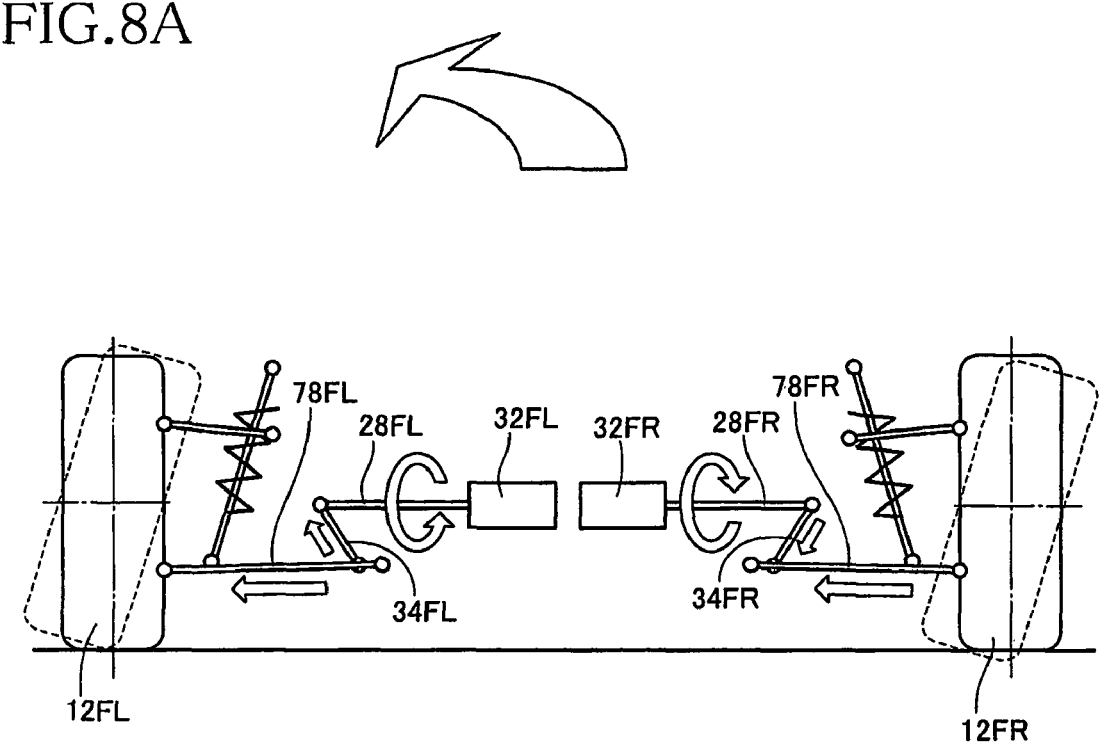
FIGS. 8A and 8B are views showing the direction of the stabilizing force generated by each stabilizer device and the change in the toe angle of each wheel during a right turn of the vehicle.
Figure 8B:
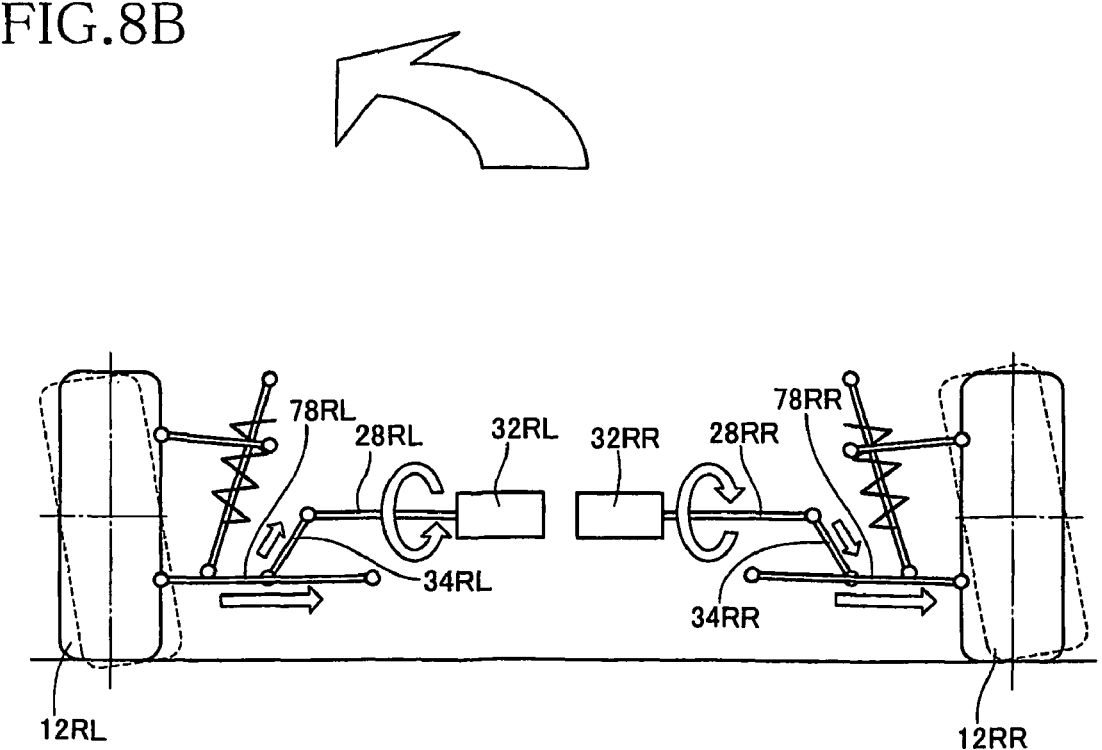

That is, each of the suspension devices 36 has compliance by which the toe and camber angles of each wheel 12 is changed depending on the direction of the axial force acting on the second lower arm 78 of a corresponding one of the suspension devices 36. FIGS. 7, 8A and 8B show the direction of the stabilizing force produced by each stabilizer device 20 and the consequent change in the toe and camber angles of the corresponding wheel 12 during a left turn of the vehicle. FIG. 7 is a plan view showing the change in the toe angle of each wheel 12. FIG. 8A is a rear view showing the change in the camber angle of each of the front wheels 12FR, 12FL. FIG. 8B is a rear view showing the change in the camber angle of each of the rear wheels 12RR, 12RL. As is apparent from FIGS. 7, 8A and 8B, during the left turn of the vehicle, the toe angle of each of the front left wheel 12FL and the rear right wheel 12RR is changed in the inward direction, the toe angle of each of the front right wheel 12FR and the rear left wheel 12RL is changed in the outward direction, the camber angle of each of the front left wheel 12FL and the rear right wheel 12RR is changed in the negative direction, and the camber angle of each of the front right wheel 12FR and the rear left wheel 12RL is changed in the positive direction. That is, during the left turn of the vehicle, the axial force based on the stabilizing force produced by each of the stabilizer devices 20FL, 20RR acts on the second lower arm 78 of a corresponding one of the suspension devices 36FL, 36RR in the direction that corresponds to a toe-in direction and a negative camber direction, while the axial force based on the stabilizing force produced by each of the stabilizer devices 20FR, 20RL acts on the second lower arm 78 of a corresponding one of the suspension devices 36FR, 36RL in the direction that corresponds to a toe-out direction and a positive camber direction, for thereby assuring the understeer tendency as the cornering characteristic of the vehicle. It is noted that, during a right turn of the vehicle, the toe and camber angles of each wheel 12 are changed in respective directions each opposite to that during the left turn of the vehicle, whereby the understeer tendency is assured also during the right turn of the vehicle.

As described above, in the vehicle equipped with the present stabilizer system 10, the understeer tendency based on the suspension geometry is reduced by the roll reduction control that is executed for stabilizing posture of the vehicle body. However, as is clear from the above description, the reduction of the understeer tendency is sufficiently compensated by the axial force acting on the second lower arm 78 of each suspension device 36. Therefore, by employing the present stabilizer system 10, it is possible to maintain the understeer tendency as the cornering characteristic of the vehicle while satisfactorily reducing the roll of the vehicle body. Even in a case where the understeer tendency is not established as the cornering characteristic by the suspension geometry per se, the understeer tendency can be established by the present stabilizer system 10.

[Actuator Efficiency Change Depending on Actuation Direction of Actuator]

There will be described an efficiency of an actuator, which is categorized into a positive efficiency and a negative efficiency. The negative efficiency $\eta_N$ corresponds to a parameter indicative of a magnitude of the motor force minimally required to inhibit the rotation of the motor 40 that could be caused by an external force acting on the stabilizer bar 28 and generated due to various factors (such as body roll, pitch and static load of the vehicle body). More precisely, the negative efficiency $\eta_N$ is defined as a ratio of the magnitude of the motor force minimally required to inhibit the rotation of the motor 40 caused by the external force, to a magnitude of the external force. On the other hand, the positive efficiency $\eta_P$ corresponds to a parameter indicative of the magnitude of the motor force minimally required to cause the torsion bar portion 90 of the stabilizer bar 28 to be rotated against the external force. More precisely, the positive efficiency $\eta_P$ is defined as a ratio of a magnitude of the external force, to the magnitude of the motor force minimally required to cause the rotation of the torsion bar portion 90. The positive efficiency $\eta_P$ and the negative efficiency $\eta_N$ can be expressed by respective expressions as follows:

Positive efficiency $\eta_P$=Fs/Fm

Negative efficiency $\eta_N$=Fm/Fs, where "Fs" represents the stabilizing force, and "Fm" represents the rotational force generated by the motor 40.

Figure 9:
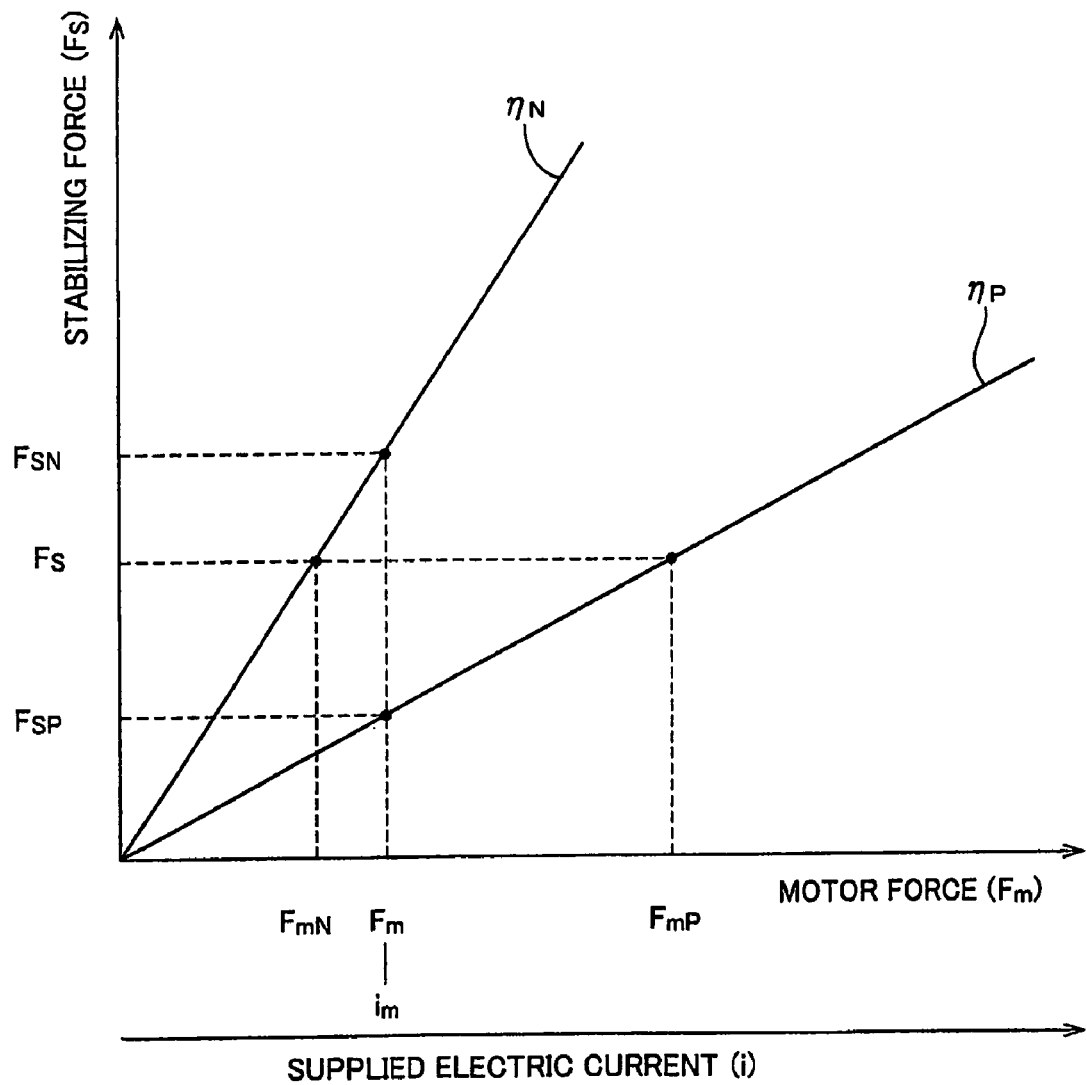
FIG. 9 is a graph showing a positive efficiency and a negative efficiency of a conventional actuator.

In a common actuator, the positive efficiency $\eta_P$ and the negative efficiency $\eta_N$ correspond to an inclination of a positive-efficiency characteristic line and an inclination of a negative-efficiency characteristic line, respectively, which are shown in FIG. 9. It can be considered that the rotational force (motor force) Fm is proportional to an electric current amount i supplied to the electric motor 40. As is apparent from FIG. 9, for producing the same magnitude of the stabilizing force Fs, the rotational force magnitude $Fm_P$ of the motor 40 required under the positive efficiency characteristic is different from the rotational force magnitude $Fm_N$ of the motor 40 required under the negative efficiency characteristic ($Fm_P$>$Fm_N$). Further, where the same magnitude of the rotational force Fm is generated by the motor 40, the stabilizing force magnitude $Fs_P$ generable under the positive efficiency characteristic is different from the stabilizing force magnitude $Fs_N$ generable under the negative efficiency characteristic ($Fs_N$>$Fs_P$). That is, where an electric current amount $i_m$ (corresponding to the magnitude of the rotational force Fm of the motor 40) is supplied to the motor 40, the motor 40 is not rotated by a magnitude of the external force that is equivalent to the stabilizing force magnitude $Fs_N$ (corresponding to the rotational force Fm according to the negative efficiency $\eta_N$), and the torsion bar portion 90 of the stabilizer bar 28 is rotated against a magnitude of the external force not larger than a magnitude of the external force that is equivalent to the stabilizing force magnitude $Fs_P$ (corresponding to the rotational force Fm according to the positive efficiency $\eta_P$).

Figure 10:
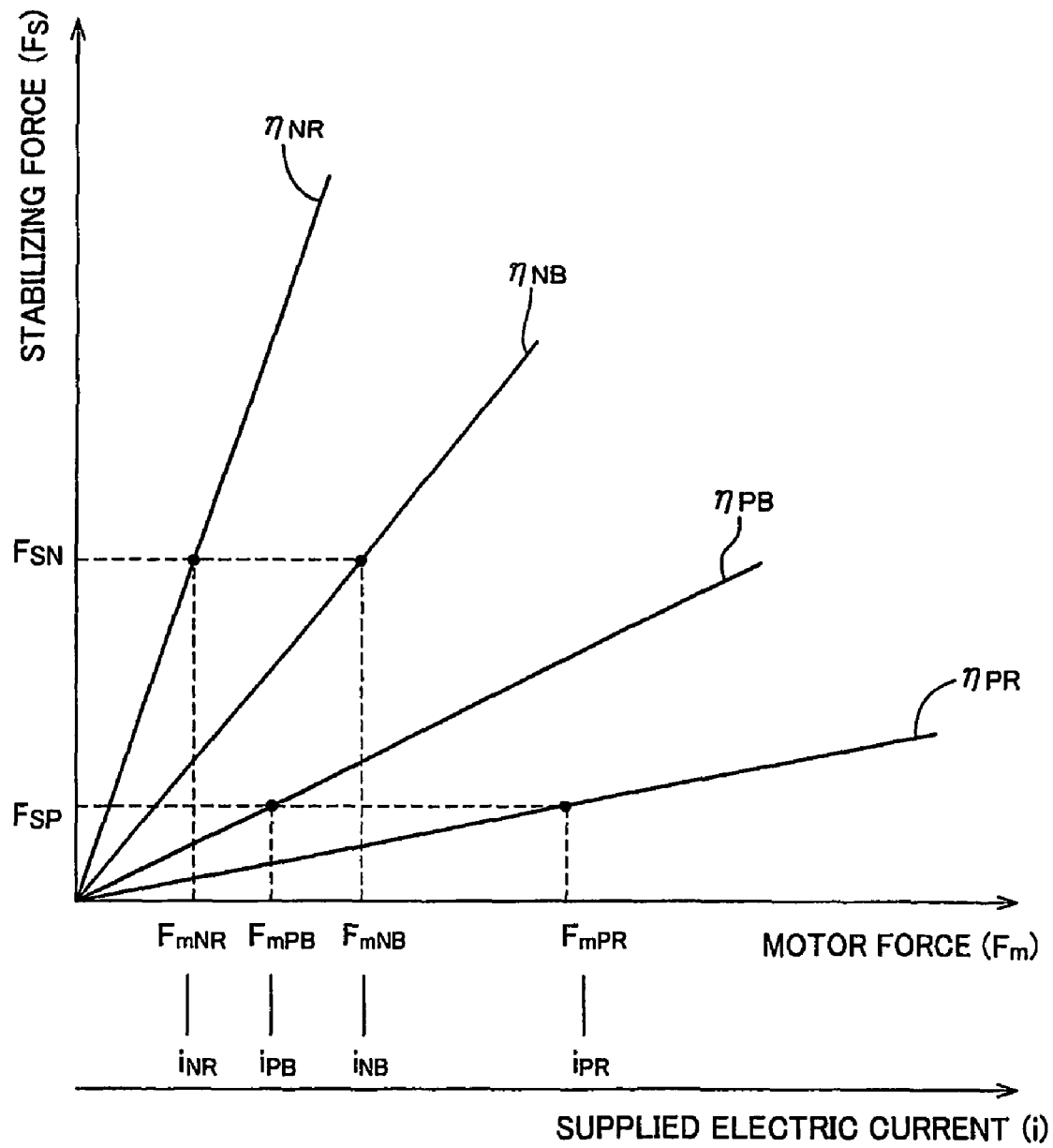
FIG. 10 is graph showing a positive efficiency and a negative efficiency of the actuator of the stabilizer device of the first embodiment.

On the other hand, the actuator 32 included in the present stabilizer system 10 is arranged such that each of the positive efficiency and the negative efficiency is changed depending on the direction of the stabilizing force, i.e., the direction of the motor force, as shown in FIG. 10. In FIG. 10, the positive efficiency $\eta_{PR}$ and the negative efficiency $\eta_{NR}$ are those when the direction of the motor force causes the stabilizing force to force the wheel 12 and the vehicle body in the rebound direction, while the positive efficiency $\eta_{PB}$ and the negative efficiency $\eta_{NB}$ are those when the direction of the motor force causes the stabilizing force to force the wheel 12 and the vehicle body in the bound direction. As is apparent from FIG. 10, the positive efficiency $\eta_P$ and the negative efficiency $\eta_N$ are both lower when the stabilizing force acts in the rebound direction than those when the stabilizing force acts in the bound direction. Specifically, for producing the same stabilizing force amount $Fs_P$ under the positive efficiency characteristic, the rotational force magnitude $Fm_{PR}$ of the motor 40 required when the direction of the motor force causes the stabilizing force to force the wheel 12 and the vehicle body in the rebound direction is larger than the rotational force magnitude $Fm_{PB}$ of the motor 40 required when the direction of the motor force causes the stabilizing force to force the wheel 12 and the vehicle body in the bound direction, so that the motor 40 or the actuator 32 is harder to be rotated against the external force in the direction causing the stabilizing force to force the wheel 12 and the vehicle body in the rebound direction. Meanwhile, for producing the same stabilizing force amount $Fs_N$ under the negative efficiency characteristic, the rotational force magnitude $Fm_{NR}$ of the motor 40 required when the direction of the motor force causes the stabilizing force to force the wheel 12 and the vehicle body in the rebound direction is smaller than the rotational force magnitude $Fm_{NB}$ of the motor 40 required when the direction of the motor force causes the stabilizing force to force the wheel 12 and the vehicle body in the bound direction, so that the motor 40 or the actuator 32 is harder to be rotated against the external force in the direction causing the stabilizing force to force the wheel 12 and the vehicle body in the bound direction. As is understood from correspondence between each of the rotational force magnitudes $Fm_{NR}$, $Fm_{NB}$, $Fm_{PR}$, $Fm_{PB}$ and a corresponding one of the electric current amounts $i_{NR}$, $i_{NB}$, $i_{PR}$, $i_{PB}$ supplied to the motor 40, under the positive efficiency characteristic, the electric power has to be supplied to the motor 40 by a larger amount when the stabilizing force acts in the rebound direction than when the stabilizing force acts in the bound direction. On the other hand, under the negative efficiency characteristic, the amount of the electric power to be supplied to the motor 40 may be smaller when the stabilizing force acts in the rebound direction than when the stabilizing force acts in the bound direction.

Figure 11A:
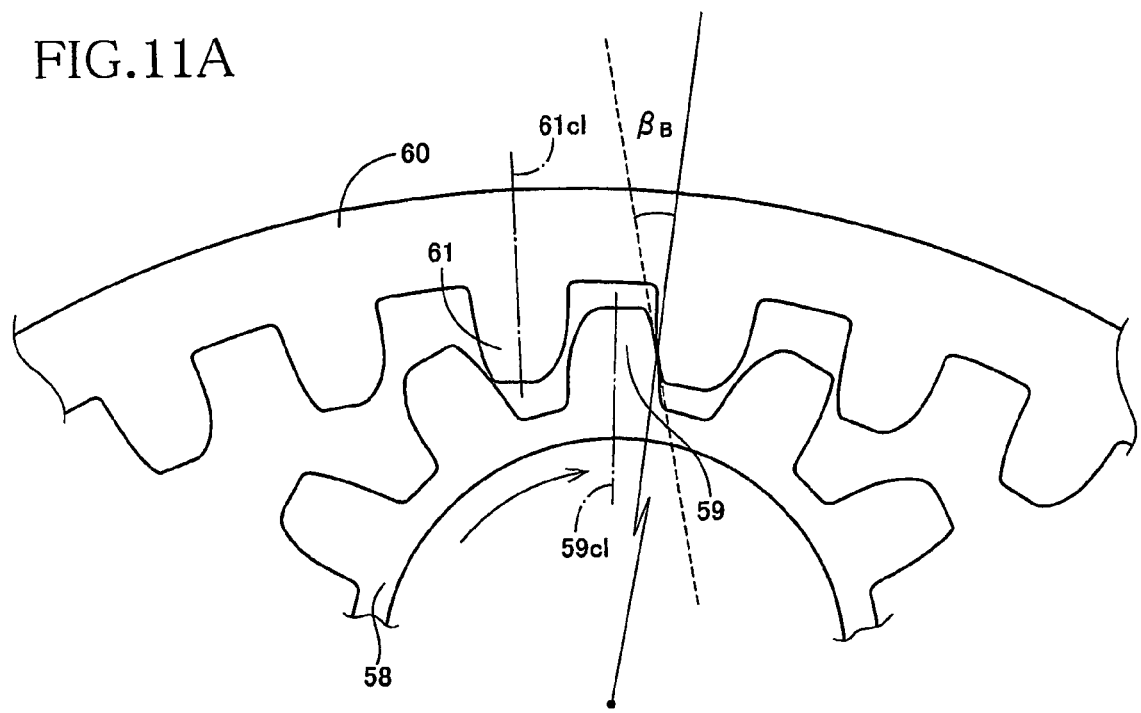
FIGS. 11A and 11B are a set of views showing meshing of a flexible gear and a ring gear that constitute a speed reducer as a component of the stabilizer device of the first embodiment.
Figure 11B:
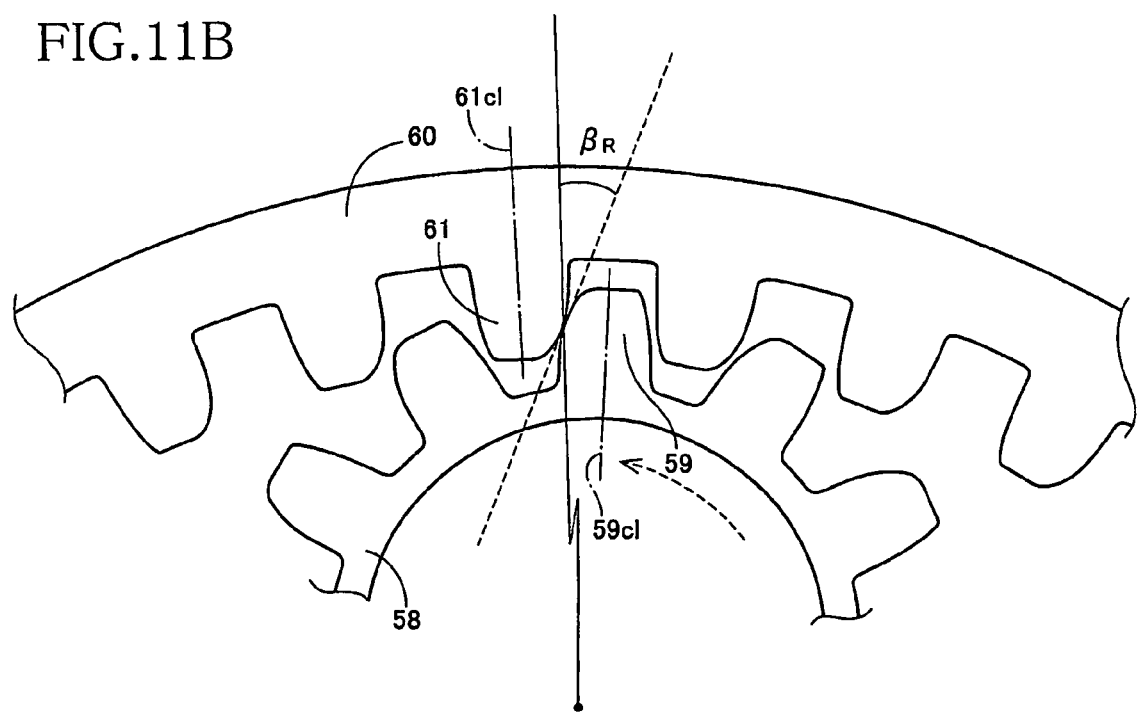

The actuator 32 includes an actuator-efficiency changing mechanism arranged to change the actuator efficiency depending on the direction of the motor force, i.e., depending on the direction of the stabilizing force. In the present embodiment, the actuator-efficiency changing mechanism is provided by a construction of the speed reducer 42 of the actuator 32 by which an amount of loss in transmission of the motor force to the torsional bar portion 90 is changed depending on the direction of the motor force. According to the construction of the speed reducer 42, as shown in FIGS. 11A and 11B, each tooth 61 formed in the inner circumferential surface of the ring gear 60 as a first gear has a tooth profile that is asymmetrical with respect to a centerline 61c1 of the tooth 61 such that a pressure angle measured in one of opposite side portions of each tooth 61 that are located on respective opposite sides of the centerline 61c1 is different from that measured in the other of the opposite side portions of each tooth 61. Similarly, each tooth 59 formed in the outer circumferential surface of the flexible gear 58 as a second gear has a tooth profile that is asymmetrical with respect to a centerline 59c1 of the tooth 59 such that a pressure angle measured in one side portion of each tooth 59 is different from that measured in another side portion of each tooth 59. FIG. 11A shows a state in which the motor 40 is rotated in the direction that causes the rotational force to act in the bound direction, while FIG. 11B shows another state in which the motor 40 is rotated in the direction that causes the rotational force to act in the rebound direction. As is apparent from FIGS. 11A and 11B, when the rotational force acts in the bound direction, the meshing of the gears 60, 58 is achieved by contact of the side portions of the respective teeth 61, 59 each having the relatively small pressure angle $\beta_B$. On the other hand, when the rotational force acts in the rebound direction, the meshing of the gears 60, 58 is achieved by contact of the side portions of the respective teeth 61, 59 each having the relatively large pressure angle $\beta_R$. Owing to the actuator-efficiency changing mechanism with such a configurationally asymmetrical arrangement in the teeth 61, 59 of the gears 60, 58, the amount of loss in the transmission of the motor force by the speed reducer 42 is changed depending on the direction of the motor force.

The negative efficiency $\eta_{NR}$ (when the motor force acts in the rebound direction) being low provides an advantage in the above-described body-height adjustment control executed in the present stabilizer system 10. In the execution of the body-height adjustment, the height of the vehicle body is adjusted by causing the stabilizing force to force the wheel 12 and the vehicle body away from each other, so as to avoid or restrain reduction in the vehicle body height, which reduction could be caused by increase in weight of luggage loaded on the vehicle and weight of passenger riding on the vehicle, from a reference state in which the luggage weight and the passenger weight are supposedly minimized. That is, for adjusting the body height, the stabilizing force is directed in the rebound direction so as to act against the external force acting in the bound direction. Since the negative efficiency $\eta_{NR}$ in the rebound direction is low, as described above, the electric motor 40 requires a relatively small amount of electric power for maintaining the adjusted body height, so that the present stabilizer system 10 is advantageous from a point of view of electric power saving.

[Controls Executed in Stabilizer System]

As described above, in the present stabilizer system 10, the four stabilizer devices 20 are controllable independently of each other, for executing the roll reduction control, the pitch reduction control and the body-height adjustment control. It is therefore possible to execute a total stabilizing control incorporating these three controls. In each of the stabilizer devices 20 under the execution of the total stabilizing control, the actuator 32 is controlled based on the roll moment, pitch moment, luggage weight and passenger weight acting on the vehicle body, such that the torsion bar portion 90 of the stabilizer bar 28 is twisted by a suitable amount whereby the stabilizing force is appropriately produced by the stabilizer device 20. Since the stabilizing force is dependent on the angular position of the electric motor 40, the motor 40 is controlled in the execution of the stabilizing control such that an actual angular position of the motor 40 is substantially equalized to a target angular position which is predetermined according to a desired magnitude of the stabilizing force. The direction and magnitude of the stabilizing force are dependent on the direction and magnitude of the rotational force produced by the motor 40, i.e., an amount of the electric power supplied to the motor 40. Therefore, the motor 40 is controlled with the electric power being supplied by an appropriate amount.

The above-described target angular position of the motor 40 is defined as a sum of a roll-reduction component of the target angular position, a pitch-reduction component of the target angular position and a body-height-adjustment component of the target angular position, which are target angular-position components directed to the respective roll reduction, pitch reduction and body-height adjustment controls. In the following description as to the respective roll reduction, pitch reduction and body-height adjustment controls, there will be described a process of determination of the target angular-position component directed to each of the roll reduction, pitch reduction and body-height adjustment controls, and also a process of determination of the amount of the electric power supplied to the motor 40.

In the following description, the angular position θ of the electric motor 40 represents an angular amount (that could exceed 360°) by which the motor 40 is deviated from a reference angular position (θ=0°) of the motor 40 in a reference state in which only a driver having a standard weight (e.g., 60 kg) rides on a vehicle that is stationary on a flat road. A positive (+) value of the angular position θ means that the motor 40 is rotated from the reference angular position in the direction that causes the rotational force to act in the rebound direction, while a negative (−) value of the angular position θ means that the motor 40 is rotated from the reference angular position in the direction that causes the rotational force to act in the bound direction. It is noted that the front stabilizer devices 20FR, 20FL provided in the front wheels 12FR, 12FL and the rear stabilizer devices 20RR, 20RL provided in the rear wheels 12RR, 12RL are slightly different with respect to the magnitude of the stabilizing force (that is to be produced) and the target angular position, because there is a difference between the front wheels 12FR, 12FL and the rear wheels 12RR, 12RL with respect to the load acting thereon and the rigidity of the suspension spring 86 provided thereto. However, in the following description, the difference between the front and rear stabilizer devices 12 is ignored in the interest of simplification of the description.

(i) Roll Reduction Control

In the roll reduction control, the roll-reduction component $\theta^*_R$ of the target angular position of the motor 40 is determined based on the lateral acceleration serving as an index of the roll moment acting on the vehicle body. Described in detail, a parameter value Gy* of the lateral acceleration (that is used as a parameter in the control) is determined, on the basis of an estimated value Gyc of the lateral acceleration estimated based on the operating angle δ of the steering wheel and the running speed v of the vehicle and also a measured value Gyr of the lateral acceleration, and according to the following expression:

$$Gy^* = K_A \cdot Gyc + K_B \cdot Gyr \quad (1),$$

where "$K_A$", "$K_B$" represents gains.

Figure 12:
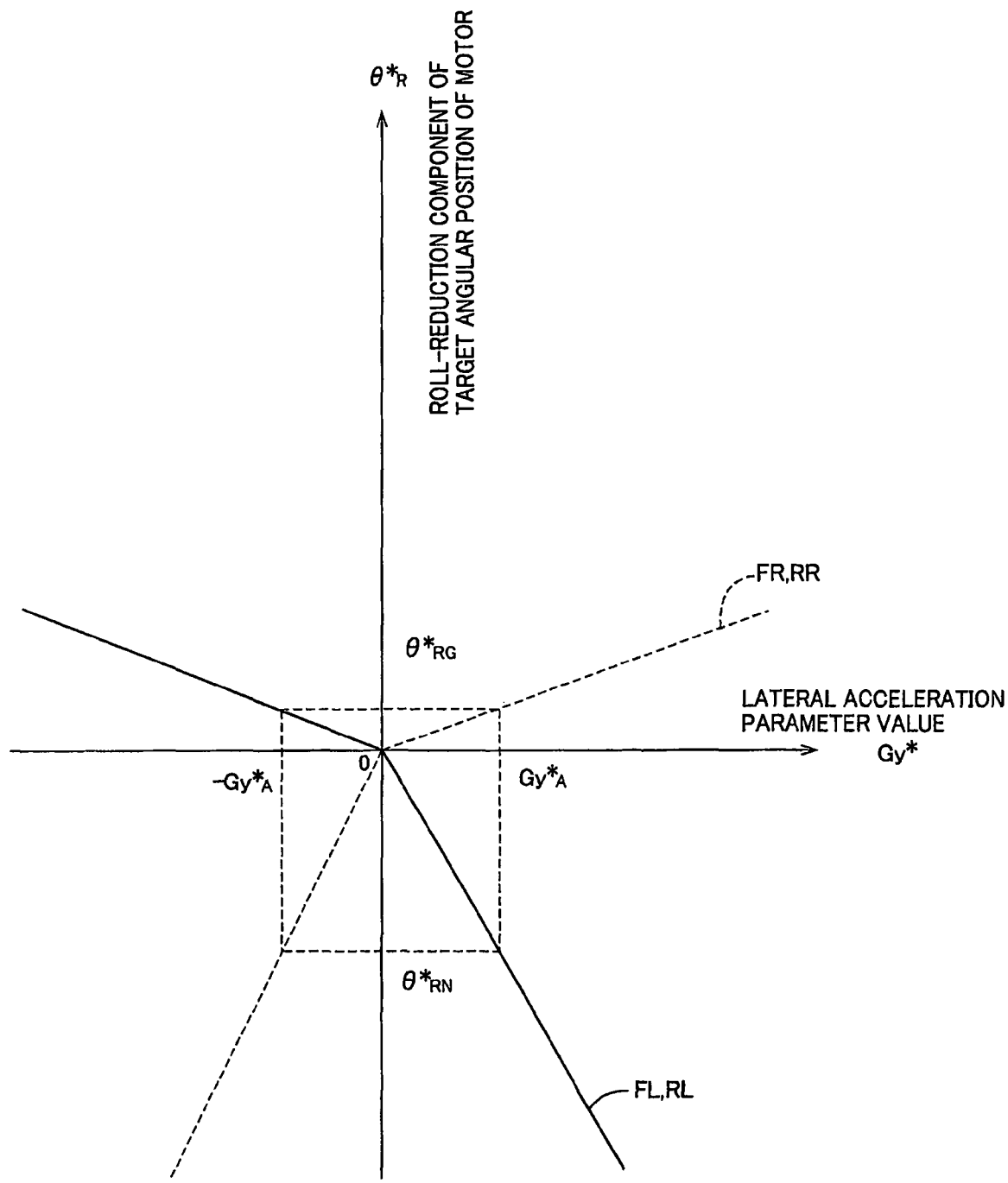
FIG. 12 is a data map representative of a relationship between a roll-reduction component of a target angular position of a motor and a lateral acceleration parameter value.

The roll-reduction component $\theta^*_R$ of the target angular position is determined based on the lateral acceleration parameter value Gy* that is determined as described above. The stabilizer ECU 150 stores a data map indicative of relationship between the roll-reduction component $\theta^*_R$ of the target angular position and the lateral acceleration parameter value Gy*, so that the roll-reduction component $\theta^*_R$ can be determined with reference to the data map, which is conceptually shown in FIG. 12. In FIG. 12, solid line corresponds to each of the stabilizer devices 20FL, 20RL provided in the left wheels 12FL, 12RL, while broken line corresponds to each of the stabilizer devices 20FR, 20RR provided in the right wheels 12FR, 12RR. Generally, the lateral acceleration parameter value Gy* is positive when the vehicle turns left, and is negative when the vehicle turns right. For example, during a left turn of the vehicle, for reducing the roll of the vehicle body, the roll-reduction component $\theta^*_R$ of the target angular position of each of the stabilizer devices 20FL, 20RL provided for the left wheels 12FL, 12RL as inside wheels is determined (as indicated in solid line of FIG. 12) for causing each of the inside wheels 12FL, 12RL to be bounded by a suitable amount, while the roll-reduction component $\theta^*_R$ of the target angular position of each of the stabilizer devices 20FR, 20RR provided for the right wheels 12FR, 12RR as outside wheels is determined (as indicated in broken line of FIG. 12) for causing each of the outside wheels 12FR, 12RR to be rebounded by a suitable amount. Where the lateral acceleration parameter value Gy* is a value $Gy^*_A$ as indicated in FIG. 12, an absolute value of the roll-reduction component $\theta^*_{RN}$ of the target angular position of each of the stabilizer devices 20FL, 20RL provided for the left wheels 12FL, 12RL is larger than an absolute value of the roll-reduction component $\theta^*_{RG}$ of the target angular position of each of the stabilizer devices 20FR, 20RR provided for the right wheels 12FR, 12RR ($|\theta^*_{RN}|>|\theta^*_{RG}|$). During a right turn of the vehicle, where the lateral acceleration parameter value Gy* is a negative value $-Gy^*_A$ as indicated in FIG. 12, the absolute value of the roll-reduction component $\theta^*_{RN}$ of the target angular position of each of the stabilizer devices 20FR, 20RR provided for the right wheels 12FR, 12RR is larger than an absolute value of the roll-reduction component $\theta^*_{RG}$ of the target angular position of each of the stabilizer devices 20FL, 20RL provided for the left wheels 12FL, 12RL ($|\theta^*_{RN}|>|\theta^{*\prime}_{RG}|$). That is, in the roll reduction control, the magnitude of the stabilizing force produced by each of the inside wheels 12 and acting in the bound direction is larger than the magnitude of the stabilizing force produced by each of the outside wheels 12 and acting in the rebound direction, so that lifting of an inside portion of the vehicle body is restrained and the position of center of gravity is lowered whereby stability of the vehicle during cornering is improved.

(ii) Pitch Reduction Control

Figure 13:
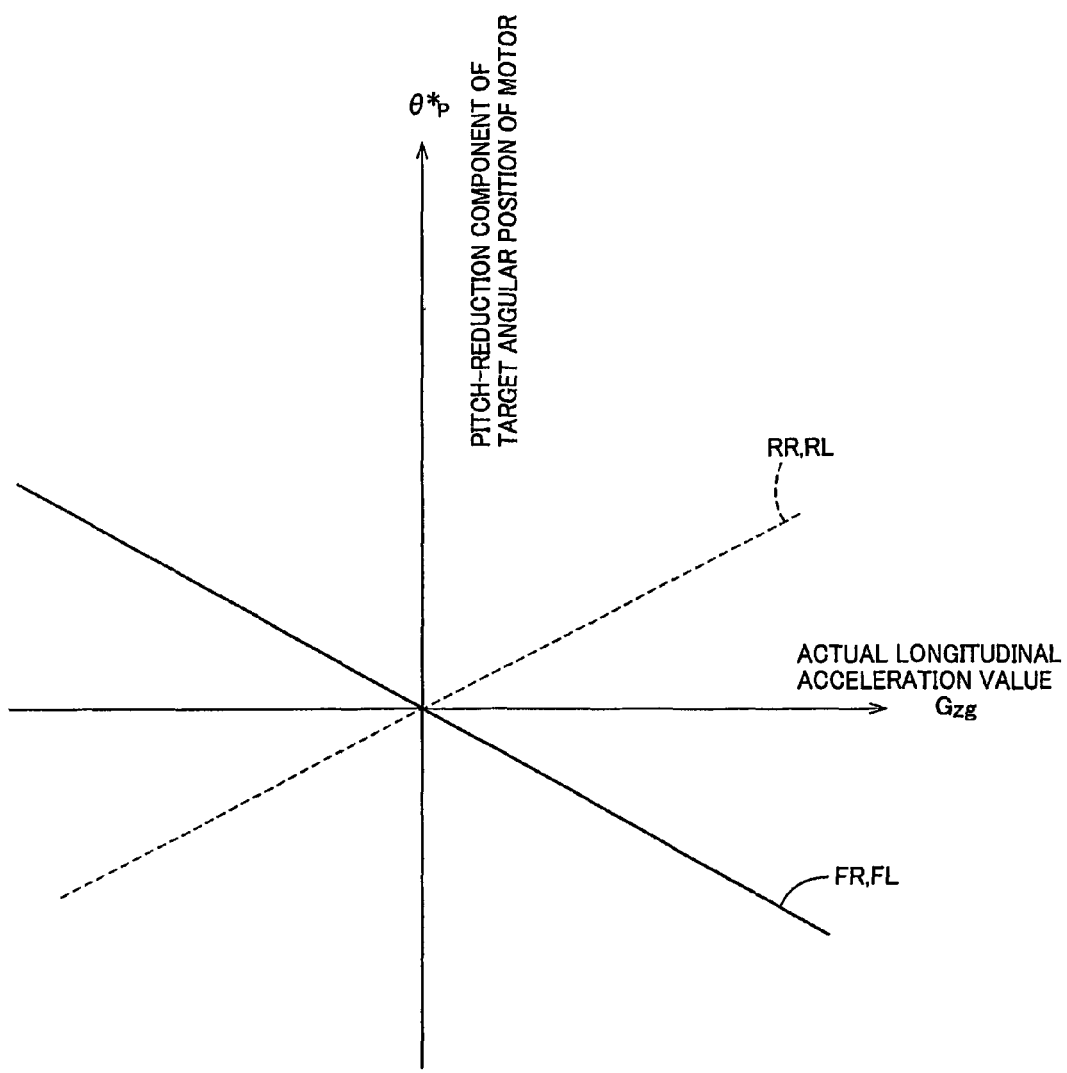
FIG. 13 is a data map representative of a relationship between a pitch-reduction component of the target angular position of the motor and an actual longitudinal acceleration value.

In the pitch reduction control, the pitch-reduction component $\theta^*_P$ of the target angular position of the motor 40 is determined based on the longitudinal acceleration serving as an index of the pitch moment acting on the vehicle body. The pitch-reduction component $\theta^*_P$ of the target angular position is determined based on a measured value Gzg of the longitudinal acceleration. The stabilizer ECU 150 stores a data map indicative of relationship between the pitch-reduction component $\theta^*_P$ of the target angular position and the measured longitudinal acceleration value Gzg, so that the pitch-reduction component $\theta^*_P$ can be determined with reference to the data map, which is conceptually shown in FIG. 13. In FIG. 13, solid line corresponds to each of the stabilizer devices 20FR, 20FL provided in the front wheels 12FR, 12FL, while broken line corresponds to each of the stabilizer devices 20RR, 20RL provided in the rear wheels 12RR, 12RL. Generally, the measured longitudinal acceleration value Gzg is positive when there is a rear-end squad of the vehicle body, for example, in acceleration of the vehicle upon starting, and is negative when there is a front-end dive of the vehicle body, for example, in deceleration of the vehicle upon braking. During abrupt acceleration of the vehicle, for reducing the rear-end squat of the vehicle body, the pitch-reduction component $\theta^*_P$ of the target angular position of each of the stabilizer devices 20FR, 20FL provided for the front wheels 12FR, 12FL is determined (as indicated in solid line of FIG. 13) for causing each of the front wheels 12FR, 12FL to be bounded by a suitable amount, while the pitch-reduction component $\theta^*_P$ of the target angular position of each of the stabilizer devices 20RR, 20RL provided for the rear wheels 12RR, 12RL is determined (as indicated in broken line of FIG. 13) for causing each of the rear wheels 12RR, 12RL to be rebounded by a suitable amount. On the other hand, during abrupt deceleration of the vehicle, for reducing the front-end dive of the vehicle body, the pitch-reduction component $\theta^*_P$ of the target angular position of each of the stabilizer devices 20FR, 20FL provided for the front wheels 12FR, 12FL is determined (as indicated in solid line of FIG. 13) for causing each of the front wheels 12FR, 12FL to be rebounded by a suitable amount, while the pitch-reduction component $\theta^*_P$ of the target angular position of each of the stabilizer devices 20RR, 20RL provided for the rear wheels 12RR, 12RL is determined (as indicated in broken line of FIG. 13) for causing each of the rear wheels 12RR, 12RL to be bounded by a suitable amount.

(iii) Body-Height Adjustment Control

In the body-height adjustment control, the body-height-adjustment component $\theta^*_H$ of the target angular position of the motor 40 is determined based on a distance between the wheel 12 and the vehicle body, which distance serves as an index of the luggage weight and the passenger weight. Described in detail, an actual distance L between the wheel 12 and the vehicle body is detected by the stroke sensor 163, and a deviation $\Delta L$ of the actual distance L from a predetermined distance $L^*$ is calculated. The predetermined distance $L^*$ is a distance between the wheel 12 and the vehicle body in the above-described reference state. The body-height-adjustment component $\theta^*_H$ of the target angular position is determined based on the distance deviation $\Delta L$. The stabilizer ECU 150 stores a data map indicative of relationship between the body-height-adjustment component $\theta^*_H$ of the target angular position and the distance deviation $\Delta L$, so that the body-height-adjustment component $\theta^*_H$ can be determined with reference to the data map. Since the reference state is a state in which the luggage weight and the passenger weight are supposedly minimized, as described above, the stabilizing force is commonly directed to increase the vehicle body height, and the body-height-adjustment component $\theta^*_H$ is a positive (+) for causing the rotational force to act in the rebound direction.

(iv) Determination of Electric Power Supplied to Motor

The target angular position $\theta^*$ of the electric motor 40 is obtained as the total of the roll-reduction component $\theta^*_R$, pitch-reduction component $\theta^*_P$ and body-height-adjustment component $\theta^*_H$ which are obtained as described above. In control of the motor 40, which is made generally based on the target angular position $\theta^*$ of the motor 40, the electric power that is to be supplied to the motor 40 is determined based on the target angular position $\theta^*$ of the motor 40 and also a deviation $\Delta\theta$ ($=\theta^*-\theta$) of an actual angular position $\theta$ of the motor 40 from the target angular position $\theta^*$ of the motor 40. The determination of the supplied electric power is determined based on the angular position deviation $\Delta\theta$ obtained by comparing the target angular position $\theta^*$ with the actual angular position $\theta$ that is fed back from the angular position sensor 55. In the present embodiment, a target electric current $i^*$ that is to be supplied to the motor 40 is determined. Described specifically, the angular position deviation $\Delta\theta$ of the motor 40 is first obtained, and then the target electric current $i^*$ is determined on the basis of the obtained angular position deviation $\Delta\theta$ and according to the following expression:

$$i^* = K_1 \cdot \Delta\theta + K_2 \cdot \theta^* \quad (2),$$

where "$K_1$", "$K_2$" represent first and second gains, respectively.

In the above expression (2), each of the first gain $K_1$ and the second gain $K_2$ varies depending on conditions as described below. The direction of the rotational force produced by the electric motor 40 varies depending on whether the target electric current $i^*$ is a positive value or a negative value. In this sense, the target electric current $i^*$ represents the direction of the rotational force as well as the magnitude of the rotational force. A right side of the above expression consists of two terms that can be considered to be components of the target electric power. The component of the first term is a component based on the angular position deviation $\Delta\theta$, while the component of the second term is a component based on the target angular position $\theta^*$. The angular position deviation $\Delta\theta$ represents an amount and a direction by and in which the motor 40 is to be rotated for causing the actual angular position $\theta$ to be equalized to the target angular position $\theta^*$. An absolute value of the angular position deviation $\Delta\theta$ indicates the amount by which the motor 40 is to be rotated. Whether the angular position deviation $\Delta\theta$ is a positive value or a negative value indicates the direction in which the motor 40 is to be rotated. That is, it can be said that the angular-position-deviation-based component is a component required to cause the motor 40 to be rotated against the external force, namely, is a component of the motor force required to cause the actuator 32 to actuate against the external force. On the other hand, it can be said the target-angular-position-based component is a component required to inhibit the motor 40 from being rotated by the external force, namely, is a component of the motor force required to maintain an operating position of the actuator 32. In general, the stabilizing force is not required for maintaining the above-described reference state. However, when the vehicle is in a non-reference state as a result of application of the external force such as elasticity of the suspension spring 48, roll moment, pitch moment and static load of the vehicle body, the stabilizing force whose magnitude corresponds to deviation from the reference state is required to maintain the non-reference state. Thus, the electric current whose amount corresponds to deviation of the target angular position $\theta^*$ from the reference angular position has to be continuously supplied to the motor 40. In view of this, the target electric current $i^*$ is determined based on the sum of the angular-position-deviation-based component and the target-angular-position-based component, rather than based on only the angular-position-deviation-based component.

In view of the actuator efficiency as discussed above, since the target-angular-position-based component may be merely a component for maintaining the angular position $\theta$ of the motor 40, the amount of the target-angular-position-based component may be dependent on the negative efficiency $\eta_N$. Therefore, in the above expression (2) for determining the target electric current $i^*$, the second gain $K_2$ in the second term may be determined such that the amount of the target-angular-position-based component is according to the characteristic of the negative efficiency $\eta_N$. On the other hand, the angular-position-deviation-based component has to be a component required for rotating the motor 40 in presence of the external force. In view of a possible case that a distance of the target angular position $\theta^*$ from the reference angular position ($\theta=0°$) is larger than a distance of the actual angular position $\theta$ from the reference angular position ($\theta=0°$), there is a requirement that the amount of the angular-position-deviation-based component has to cause the sum of the two components to exceed the positive efficiency $\eta_P$. Therefore, in the above expression (2), the first gain $K_1$ in the first term has to be determined such that the above requirement is satisfied.

However, as described above, according to the actuator efficiency of the present stabilizer system 10, the positive efficiency $\eta_P$ and the negative efficiency $\eta_N$ are both relatively low, when the stabilizing force acts in the rebound direction, namely, when the motor 40 is rotated in the direction that causes the rotational force to act in the rebound direction. The positive efficiency $\eta_P$ and the negative efficiency $\eta_N$ are both relatively high, when the stabilizing force acts in the bound direction, namely, when the motor 40 is rotated in the direction that causes the rotational force to act in the bound direction. Thus, in the present stabilizer system 10, the first gain $K_1$ is changed depending on whether the angular position deviation $\Delta\theta$ is a positive value or a negative value. Specifically described, when the angular position deviation $\Delta\theta$ is a positive value, the actuator 32 has to be actuated by causing the motor 40 to produce the rotational force acting in the rebound direction. When the angular position deviation $\Delta\theta$ is a negative value, the actuator 32 may be actuated by causing the motor 40 to produce the rotational force acting in the bound direction. Thus, when the angular position deviation $\Delta\theta$ is not smaller than zero ("0"), the first gain $K_1$ is provided by $K_{1(H)}$. When the angular position deviation $\Delta\theta$ is smaller than zero ("0"), the first gain $K_1$ is provided by $K_{1(L)}$ ($<K_{1(H)}$). Meanwhile, the second gain $K_2$ is changed depending on whether the target angular position $\theta^*$ is a positive value or a negative value. Specifically described, when the target angular position $\theta^*$ is a positive value, the operating position of the actuator 32 may be maintained by causing the motor 40 to produce the rotational force acting in the rebound direction. When the target angular position $\theta^*$ is a negative value, the operating position of the actuator 32 has to be maintained by causing the motor 40 to produce the rotational force acting in the bound direction. Thus, when the target angular position $\theta^*$ is not smaller than zero ("0"), the second gain $K_2$ is provided by $K_{2(L)}$. When the target angular position $\theta^*$ is smaller than zero ("0"), the second gain $K_2$ is provided by $K_{2(H)}$ ($>K_{2(L)}$).

After the target electric current $i^*$ has been determined according to the above expression (2) by changing the first and second gains $K_1$, $K_2$, the inverter 132 receives a command indicative of the direction of the motor force that is dependent on whether the target electric current $i^*$ is a positive value or a negative value and another command indicative of a duty ratio that is dependent on an absolute value of the target electric current which are supplied from the stabilizer ECU 150, so that the actuation of the actuator 32, i.e., the operation of the stabilizer device 20 is controlled under control of the inverter 132.

In the execution of the total stabilizing control, the roll reduction control and the pitch reduction control are executed upon cornering, abrupt acceleration and abrupt deceleration of the vehicle each of which is occurred during ordinary running of the vehicle, while the body-height adjustment control is executed as needed. The body-height adjustment control often requires to be executed somewhat continuously or permanently. Therefore, in general, the body-height adjustment control is executed for a larger length of time than the roll reduction control and the pitch reduction control. Since the stabilizing force is directed mainly in the rebound direction during the execution of the body-height adjustment control, as described above, the second gain $K_2$ of the target-angular-position-based component (serving as a component for maintaining the vehicle body height for a large length of time) can be provided by a small value. Thus, the present stabilizer system 10 is advantageous from a point of view of electric power saving, in spite of execution of the body-height adjustment control.

[Stabilizing Control Routine Program]

Figure 14:
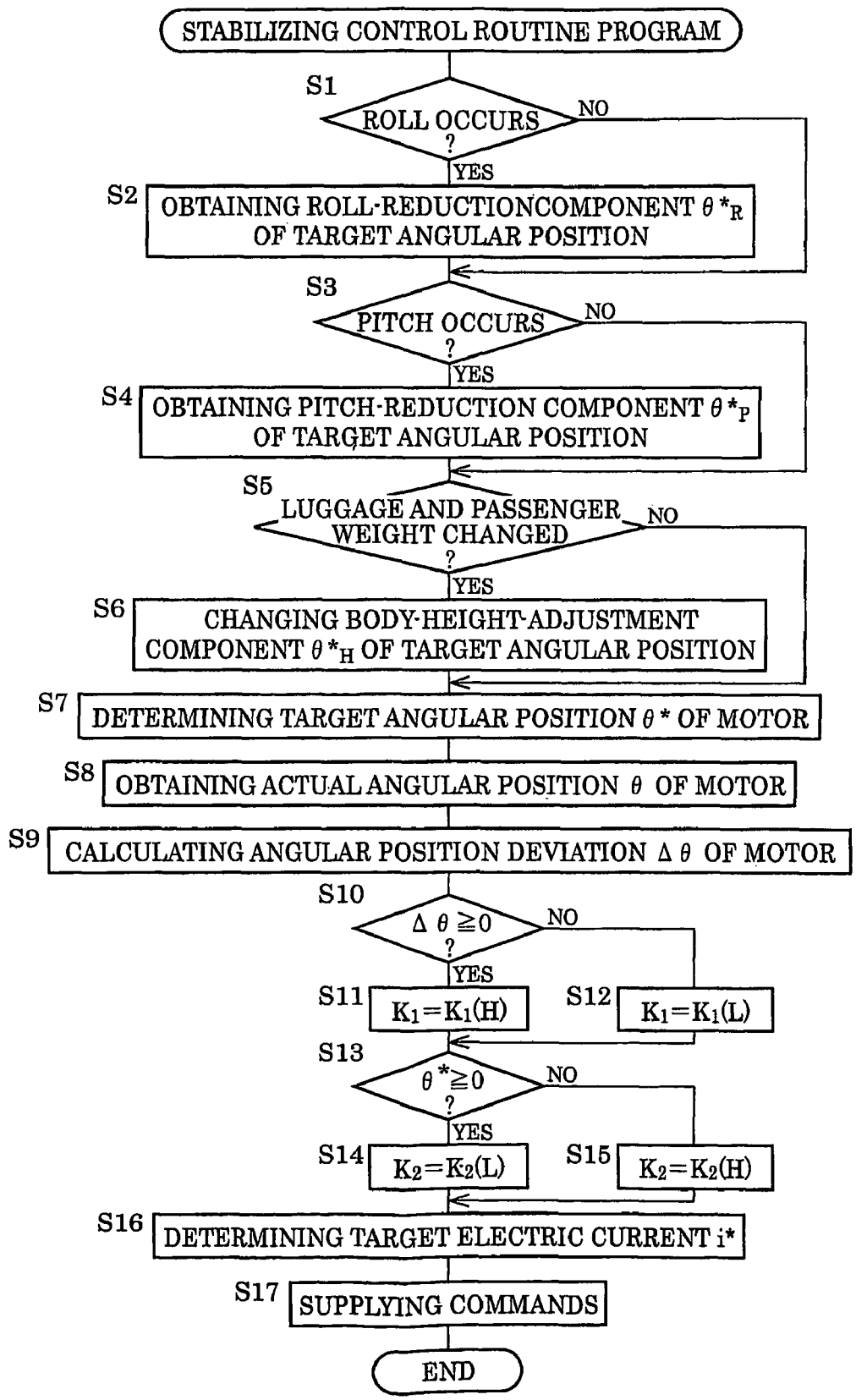
FIG. 14 is a flow chart showing a stabilizing control routine program that is executed in the stabilizer system of the first embodiment.
Figure 15:
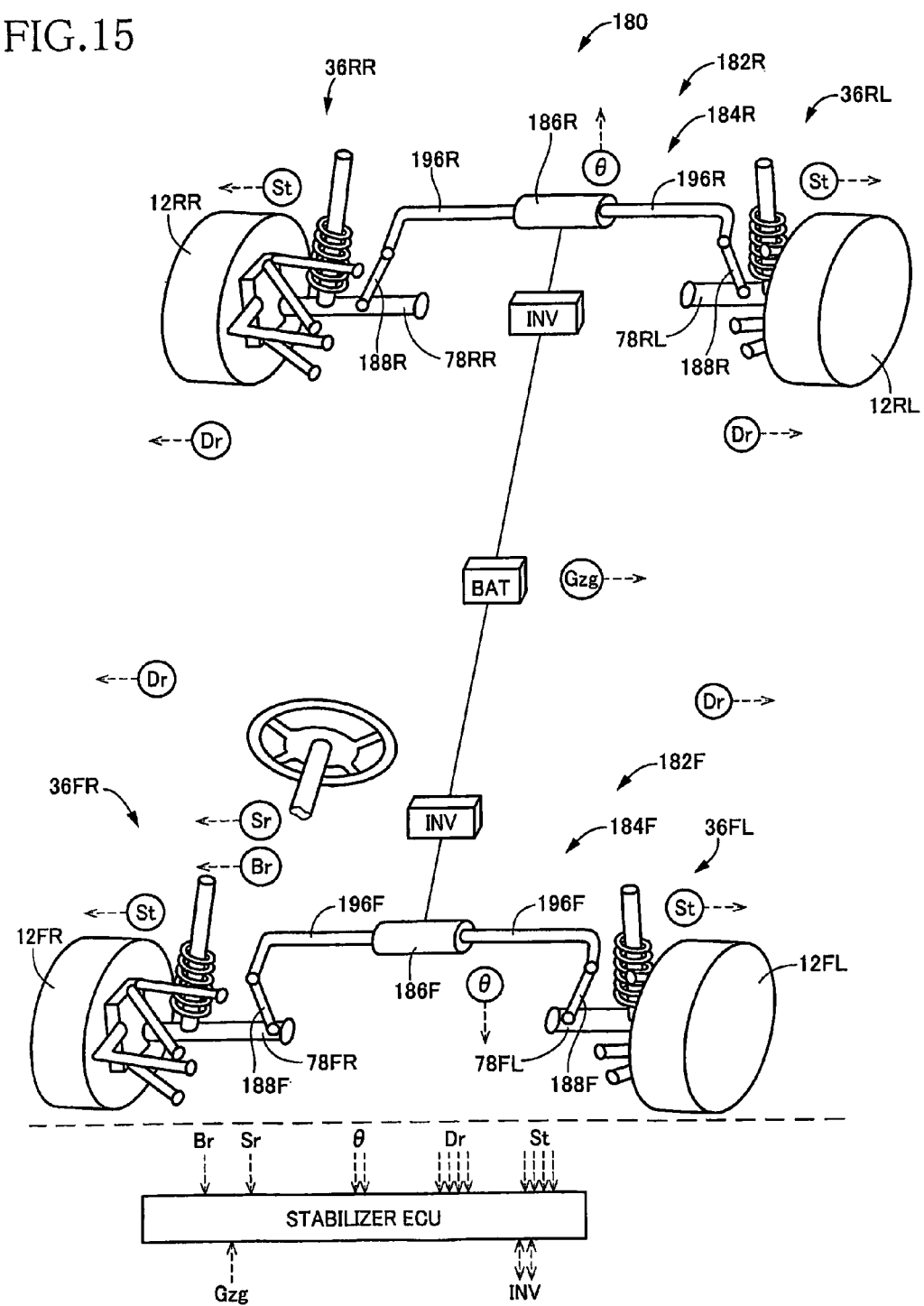
FIG. 15 is a view showing an overall construction of a stabilizer system according to a second embodiment of the invention.

The above-described total stabilizing control is executed by the stabilizer ECU 150, in accordance with a stabilizing control routine program illustrated in a flow chart of FIG. 14. This stabilizing control routine program is repeatedly executed at a short time interval (e.g., several tens of milliseconds), while an ignition switch of the vehicle is placed in its ON state. Hereinafter, the stabilizing control routine program will be described in detail by reference to the flow chart of FIG. 14.

The stabilizing control routine program is initiated with a step S1 of determining whether a roll of the vehicle body occurs. This determination is made based on values detected by the operating angle sensor 152 and the running speed sensor 154, since the roll occurs upon turning of the vehicle. Specifically, it is determined that the roll of the vehicle body will be caused or is being actually caused due to cornering of the vehicle, when the operating angle of the steering wheel is not smaller than a threshold and the running speed of the vehicle is not smaller than a threshold. If an affirmative decision is obtained in step S1, the control flow goes to step S2 that is implemented to obtain the roll-reduction component $\theta^*_R$ of the target angular position, as described above, for executing the roll reduction control.

Then, step S3 is implemented to determine whether a pitch of the vehicle body occurs. The pitch of the vehicle body can be categorized into a front-end dive that occurs upon deceleration of the vehicle, and a rear-end squat that occurs upon acceleration of the vehicle. Therefore, the determination is made based on values detected by the longitudinal acceleration sensor 158, the throttle sensor 160 and the brake pressure sensor 162, so as to see if the dive or squat whose degree exceeds a permissible maximum degree occurs. Specifically, it is determined that the dive of the vehicle body will be caused or is being actually caused, when an absolute value of the longitudinal acceleration is not smaller than a threshold and the brake pressure is not smaller than a threshold. Further, it is determined that the squat of the vehicle body will be caused or is being actually caused, when an absolute value of the longitudinal acceleration is not smaller than a threshold and the opening angle of the throttle valve is not smaller than a threshold. If an affirmative decision is obtained in step S3, the control flow goes to step S4 that is implemented to obtain the pitch-reduction component $\theta^*_P$ of the target angular position, as described above, for executing the pitch reduction control.

Then, step S5 is implemented to determine whether the weight of the luggage and passenger acting on the vehicle body is changed. Specifically, this determination is made using output signals supplied from the ignition switch, the door sensor 164 that is provided in each door of the vehicle and the stroke sensor 163 that is provided to detect the distance between the wheel 12 and the vehicle body. It is determined that there is a possibility of change in the luggage and passenger weight, when it is assumed that the luggage and passenger have been increased or reduced, namely, immediately after placement of the ignition switch into its ON state, or upon detection of closing of at least one door of the vehicle after its opening. If it is determined that there is the possibility of the weight change, the deviation $\Delta L$ of the distance L between the corresponding wheel 12 and the vehicle body is obtained based on the value detected by the stroke sensor 163. That is, in step S5, it is determined whether the weight acting on the vehicle body is changed, by comparing the currently obtained deviation $\Delta L$ with the last obtained deviation $\Delta L$, namely, by seeing if the deviation $\Delta L$ has been substantially changed. If an affirmative decision is obtained in step S5, the control flow goes to step S6 that is implemented to change the body-height-adjustment component $\theta^*_H$ of the target angular position of the motor 40. In step S6, an amount of the body-height-adjustment component $\theta^*_H$ is newly obtained, and the newly obtained amount of the body-height-adjustment component $\theta^*_H$ replaces an amount of the body-height-adjustment component $\theta^*_H$ that had been last obtained and stored in the stabilizer ECU 150. The newly obtained amount of the body-height-adjustment component $\theta^*_H$ is stored until implementation of step S6 in the next cycle of execution of the routine program.

Next, step S7 is implemented to determine the target angular position $\theta^*$ of the motor 40, by adding the roll-reduction component $\theta^*_R$, pitch-reduction component $\theta^*_P$ and body-height-adjustment component $\theta^*_H$. Step S7 is followed by steps S8 and S9 in which the actual angular position θ is obtained and then the angular position deviation Δθ is calculated based on the target angular position θ* and the actual angular position θ. Then, step S10 is implemented to determine whether the angular position deviation Δθ is equal to or larger than zero ("0"). If an affirmative decision is obtained in step S10, the control flow goes to step S11 in which the first gain $K_1$ is set at $K_{1(H)}$. If a negative decision is obtained in step S10, the control flow goes to step S12 in which the first gain $K_1$ is set at $K_{1(L)}$. Step S11 or step S12 is followed by step S13 that is implemented to determine whether the target angular position θ* is equal to or larger than zero ("0"). If an affirmative decision is obtained in step S13, the control flow goes to step S14 in which the second gain $K_2$ is set at $K_{2(L)}$. If a negative decision is obtained in step S13, the control flow goes to step S15 in which the second gain $K_2$ is set at $K_{2(H)}$. Step S14 or step S15 is followed by step S16 that is implemented to determine the target electric current i*, based on the first and second gains $K_1$, $K_2$, according to the above expression (2). One cycle of execution of the stabilizing control routine program of FIG. 14 is completed with step S17 that is implemented to supply the command indicative of the direction of the motor force (that is dependent on whether the target electric current i* is a positive value or a negative value) and the command indicative of the duty ratio (that is dependent on an absolute value of the target electric current i*) to the inverter 132.

(B) Second Embodiment

Referring next to FIGS. 15-18, there will be described a vehicle stabilizer system 180 constructed according to a second embodiment of the invention. In this vehicle stabilizer system 180, the pitch reduction control and the body-height adjustment control are executed although the roll reduction control is not executed. In the following description, the same reference signs as used in the first embodiment will be used to identify the functionally corresponding elements, and redundant description of these elements is not provided.

The stabilizer system 180 includes a pair of stabilizer devices 182, one of which is provided for the front wheels 12FR, 12FL and the other of which is provided for the rear wheels 12RR, 12RL. Each of the stabilizer devices 182 includes a stabilizer bar 184, an actuator 186 operable to rotate the stabilizer bar 184, and a pair of link rods 188. The stabilizer bar 184 is connected at its axially opposite end portions to the respective right and left suspension devices 36 via the respective link rods 34, and is connected at its axially intermediate portion to the actuator 186. As is apparent from FIG. 15, the stabilizer device 182 and stabilizer bar 184 are provided for each of the front pair of wheels 12F and rear pair of wheels 12R. In the following description, each of the stabilizer device 182 and stabilizer bar 184 is referred together with one of reference signs F, R indicative of the respective front and rear pairs of wheels, where it should be clarified which one of the front and rear pairs of wheels the referred device or component corresponds to.

Figure 16:
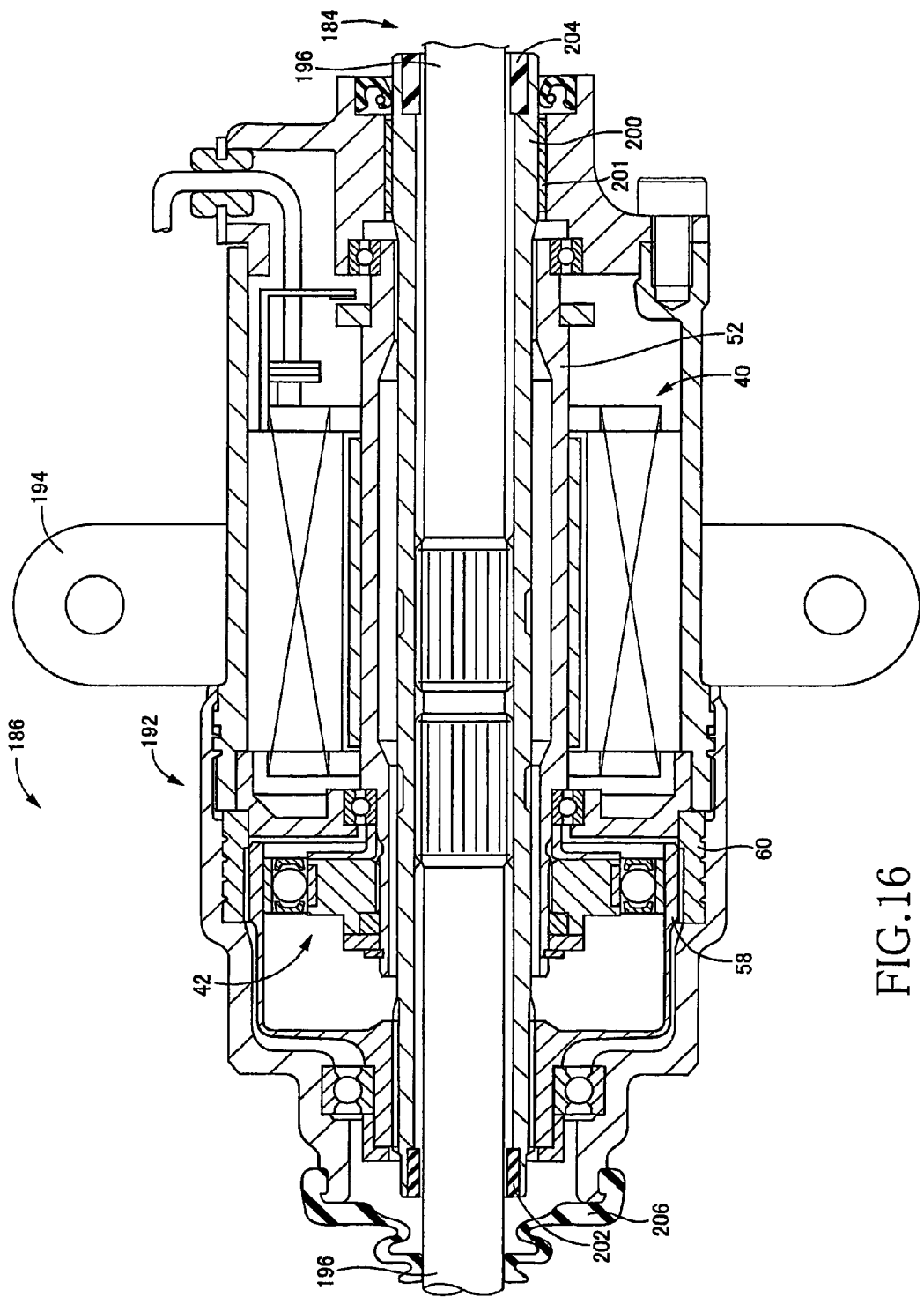
FIG. 16 is a cross sectional view of an actuator as a component of a stabilizer device of the second embodiment of the invention.

As shown in FIG. 16, the actuator 186 includes a generally cylindrical-shaped housing 192 fixedly attached to the vehicle body through a pair of attachment members 194 that are provided in an outer circumferential surface of the housing 192. The actuator 186 further includes the electric motor 40 and the speed reducer 42 disposed within the housing 192. The stabilizer bar 184 is connected to the actuator 186, while extending through the hollow motor shaft 52 of the motor 40, i.e., through the actuator 186. Specifically described, the stabilizer bar 184 includes a pair of stabilizer bar members 196 and a connecting pipe 200 which interconnects the stabilizer bar members 196 and which extends through the hollow motor shaft 52. The stabilizer bar members 196 are introduced into the housing 192 through respective opposite end portions of the housing 192, and introduced into the connection pipe 200 through respective opposite end portions of the pipe 200. An axial end portion of each of the stabilizing bar members 196 is located within the connection pipe 200, and is serrated in its outer circumferential surface so as to be held in engagement with an inner circumferential surface of an axially intermediate portion of the connection pipe 200 that is also serrated. Owing to the serration engagement, each of the stabilizing bar members 196 and the connection pipe 200 are connected to each other, and are unrotatable and axially unmovable relative to each other. An axial end portion of the connection pipe 200 is serrated in its outer circumferential surface so as to be held in serration engagement with the inner circumferential surface of the hole formed through the bottom wall of the cup-shaped flexible gear 58 that is also serrated, whereby the connection pipe 200 and the flexible gear 58 are connected to each other, unrotatably and axially unmovably relative to each other. Another axial end portion of the connection pipe 200 is rotatably held by the housing 192 through a bearing bushing 210. Annular dumper members 202, 204 each made of a rubber are fixed to respective opposite end portions of an inner circumferential surface of the connection pipe 200. An annular sealing boot 206 is provided in an end portion of the housing 192. It is noted that, in this second embodiment, the flexible gear 58 serves as an output portion of the speed reducer 42.

Figure 17:
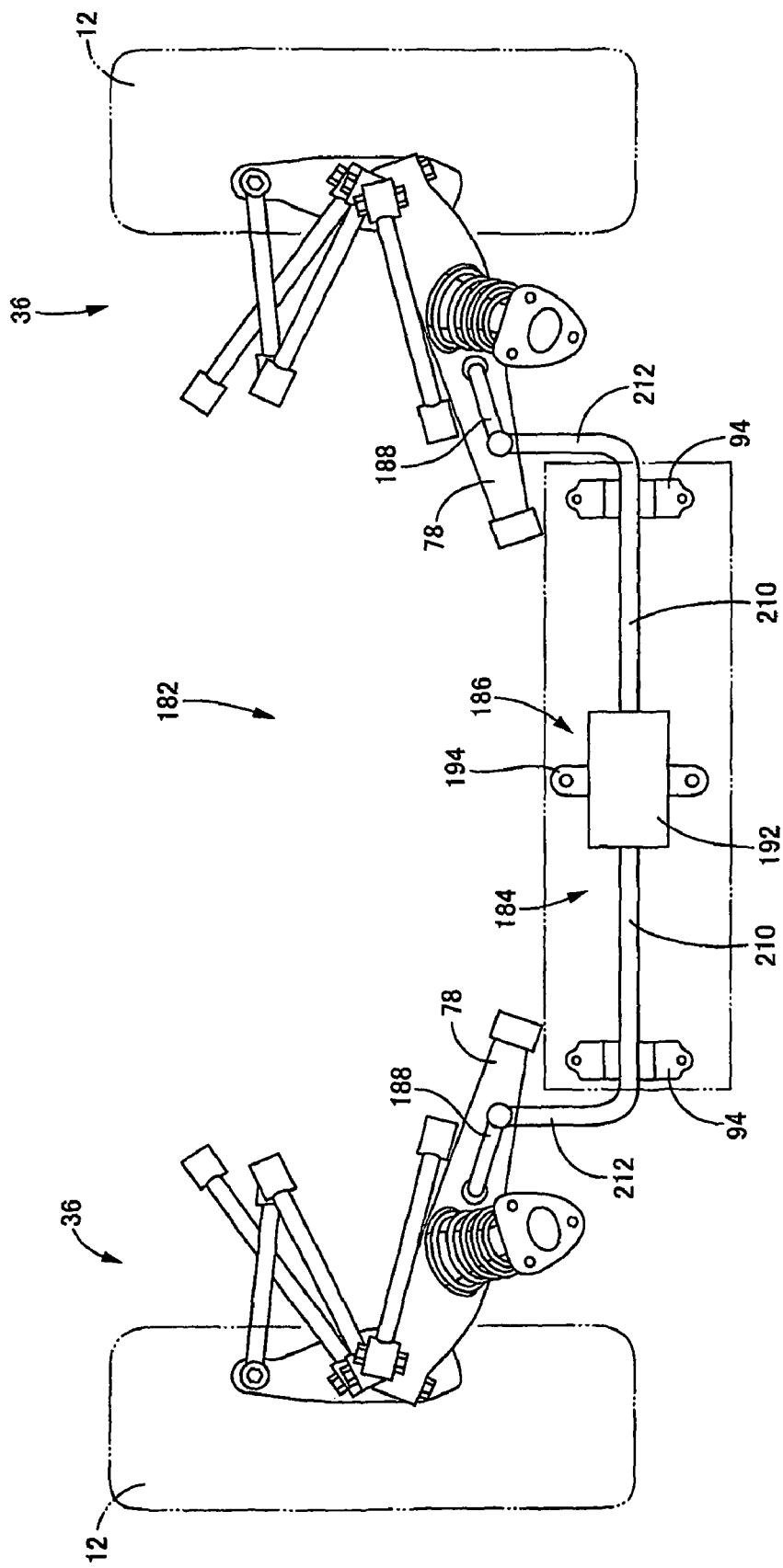
FIG. 17 is a view of the stabilizer device of the second embodiment which is connected to the suspension devices, as seen from an upper side of a vehicle.

FIG. 17 is a view of the stabilizer device 182, suspension devices 36 and right and left wheels 12, as seen from an upper side of the vehicle. The stabilizer bar 184 of the stabilizer device 182 includes a torsion bar portion 210 which extends substantially in the lateral direction of the vehicle, and a pair of arm portions 212 which are contiguous to respective opposite end portions of the torsion bar portion 210 and which extend in a direction not parallel to the torsion bar portion 210, e.g., substantially in the forward direction of the vehicle. That is, the torsion bar portion 210 includes the connection pipe 200 and portions of the respective stabilizer bar members 196 that extend substantially in the widthwise or lateral direction of the vehicle. The torsion bar portion 210 of the stabilizer bar 184 is rotatably held, at its portions that are close to the respective arm portions 212, by a pair of retainers 94 that are fixed to the vehicle body. The actuator 186 is fixed through the above-described attachment 194 to a widthwise central portion of the vehicle body. Each of the arm portions 212 of the stabilizer bar 184 is connected at one of its longitudinal end portions (that is remote from the torsion bar portion 210) to the second lower arm 78 of a corresponding one of the right and left suspension devices 36 via a corresponding one of the link rods 188. Like the link rod 34 of each stabilizer device 20 in the first embodiment, each of the link rods 188 that is connected to the second lower arm 78 of a corresponding one of the suspension devices 36 is inclined with respect to the second lower arm 78. Described more specifically, each of the link rods 188F is connected at its suspension-arm connection end portion to a corresponding one of the second lower arms 78FR, 78FL of the front suspension devices 36FR, 36FL with inclination of each link rod 34 with respect to the corresponding second lower arm 78 such that the suspension-arm connection end portion of each link rod 34 is located on inside of another end portion of each link rod 34 in the lateral direction of the vehicle, like the link rod 34 in the first embodiment (see FIG. 5). Meanwhile, each of the link rods 188R is connected at its suspension-arm connection end portion to a corresponding one of the second lower arms 78RR, 78RL of the rear suspension devices 36RR, 36RL with inclination of each link rod 34 with respect to the corresponding second lower arm 78 such that the suspension-arm connection end portion of each link rod 34 is located on outside of another end portion of each link rod 34 in the lateral direction of the vehicle, like the link rod 34 in the first embodiment (see FIG. 6).

In the stabilizer system 180 of this second embodiment, although an active roll reduction control is not executed, the stabilizer bar 184 of the stabilizer device 182 functions substantially in the same manner as a conventional stabilizer bar, during turning of the vehicle. Described in detail, the torsion bar portion 210 is twisted by the roll of the vehicle body, and the roll of the vehicle body is restrained or reduced owing to the stabilizing force dependent on a reaction that is generated as a result of twisting or torsion of the torsion bar portion 210. The stabilizer bar 184 thus restrains displacement of the wheel 12 and the vehicle body toward or away from each other, which displacement results from turning of the vehicle. This leads to reduction in the understeer tendency as the cornering characteristic that is dependent on the above-described suspension geometry. However, in the stabilizer device 182 in the present second embodiment, owing to the inclination of each link rod 188 as described above, a part of the stabilizing force produced by the stabilizer device 182 acts on the second lower arm 78 in the axial direction of the second lower arm 78, namely, an axial force as a component of the stabilizing force acts on the second lower arm 78. Thus, each of the suspension devices 36 is given compliance by which the toe and camber angles of each wheel 12 is changed depending on the direction of the axial force acting on the second lower arm 78 of a corresponding one of the suspension devices 36, so that the understeer tendency is increased by the axial force acting on the second lower arm 78 of each suspension device 36. Therefore, by employing the present stabilizer system 180, it is possible to maintain the understeer tendency as the cornering characteristic of the vehicle, while satisfactorily reducing the roll of the vehicle body without executing the active roll reduction control.

Further, in each of the stabilizer devices 182 in the present second embodiment, the actuator 186 enables the stabilizer bar 184 to generate the right stabilizing force forcing the right wheel 12R and the vehicle body and the left stabilizing force forcing the left wheel 12L and the vehicle body, such that the right and left stabilizing forces both act in the same one of the bound and rebound directions. Further, in the stabilizer system 180 of the present second embodiment, the two stabilizing devices 182 are controllable independently of each other. That is, the stabilizing forces produced by the respective stabilizer devices 182 are controlled independently of each other, for executing the pitch reduction control for reducing pitch of the vehicle body, and the body-height adjustment control for adjusting the vehicle body height from a road surface.

Further, like the actuator 32 in the first embodiment, the actuator 186 includes the actuator-efficiency changing mechanism arranged to change the actuator efficiency depending on the direction of the motor force. According to the construction of the speed reducer 42 of the actuator 186 providing the actuator-efficiency changing mechanism, the meshing of the gears 60, 58 is achieved by contact of the side portions of the respective teeth 61, 59 each having the relatively small pressure angle $\beta_B$ during application of the motor force in the bound direction, and the meshing of the gears 60, 58 is achieved by contact of the side portions of the respective teeth 61, 59 each having the relatively large pressure angle $\beta_R$ during application of the motor force in the rebound direction, as in the first embodiment (see FIGS. 11A, 11B). That is, the positive efficiency $\eta_P$ and the negative efficiency $\eta_N$ are both lower when the stabilizing force acts in the rebound direction than those when the stabilizing force acts in the bound direction. Therefore, as in the first embodiment, in the execution of the body-height adjustment control, the electric motor 40 requires a relatively small amount of electric power for maintaining the adjusted body height, so that the present stabilizer system 180 is advantageous from a point of view of electric power saving.

Figure 18:
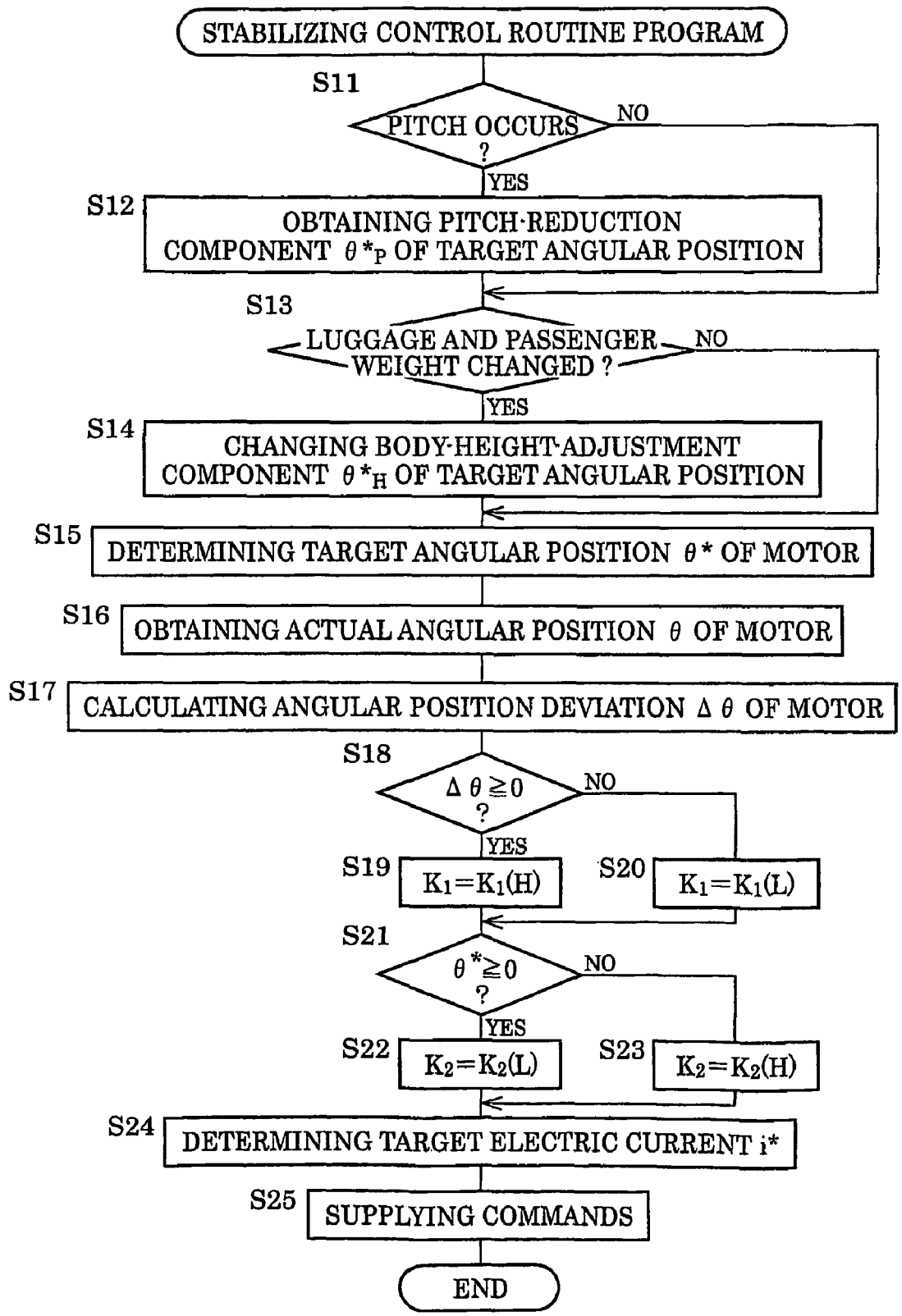
FIG. 18 is a flow chart showing a stabilizing control routine program that is executed in the stabilizer system of the second embodiment.
Figure 19:
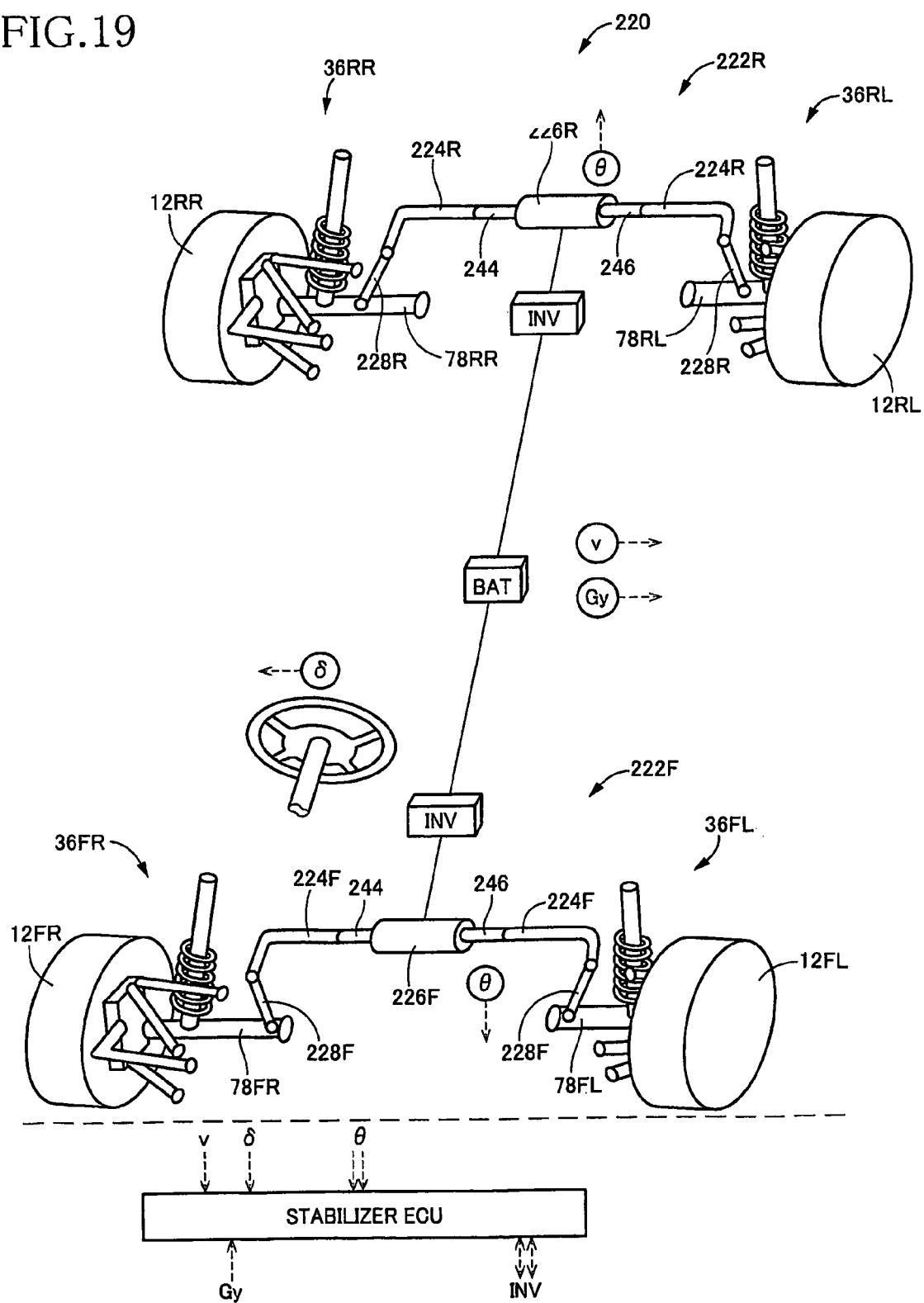
FIG. 19 is a view showing an overall construction of a stabilizer system according to a third embodiment of the invention.

In the present stabilizer system 180 in which the pitch reduction control and the body-height adjustment control are executable, it is possible to execute a total stabilizing control incorporating these two controls. This total stabilizing control is executed by the stabilizer ECU 150, in accordance with a stabilizing control routine program illustrated in a flow chart of FIG. 18. The stabilizing control routine program of FIG. 18 is repeatedly executed at a short time interval (e.g., several tens of milliseconds), while the ignition switch of the vehicle is placed in its ON state. Since the pitch reduction control and the body-height adjustment control are executed in substantially the same manner as those in the first embodiment, redundant description of these controls is not provided in the following description with reference to the flow chart of FIG. 18. It is noted that, in the total stabilizing control in the present second embodiment, the stabilizing devices 182 provided for the front pair of wheels 12F and rear pair of wheels 12R are controlled independently of each other.

The stabilizing control routine program of FIG. 18 is initiated with a step S11 of determining whether a pitch of the vehicle body occurs. If an affirmative decision is obtained in step S11, the control flow goes to step S12 that is implemented to obtain the pitch-reduction component $\theta^*_P$ of the target angular position, for executing the pitch reduction control. Then, step S13 is implemented to determine whether the weight of the luggage and passenger acting on the vehicle body is changed. In the determination in step S5 of the stabilizing control routine program of FIG. 14 in the first embodiment, the determination is made based on the deviation $\Delta L$ of the actual distance L between the corresponding wheel 12 and the vehicle body from a predetermined distance L*. However, in the determination in step S13 of the stabilizing control routine program of FIG. 18, the determination is made based on a deviation $\Delta L$ of an average of the actual distance L between the right wheel 12R and the vehicle body and the actual distance L between the left wheel 12L and the vehicle body, from a predetermined distance L*. Next, step S15 is implemented to determine the target angular position $\theta^*$ of the motor 40, by adding the pitch-reduction component $\theta^*_P$ and body-height-adjustment component $\theta^*_H$. The subsequent steps S16-S25 are implemented in the same manner as the steps S8-S17 of the stabilizing control routine program of FIG. 14 in the first embodiment. One cycle of execution of the stabilizing control routine program of FIG. 18 is completed with step S25.

(C) Third Embodiment

Referring next to FIGS. 19-23, there will be described a vehicle stabilizer system 220 constructed according to a third embodiment of the invention. In this vehicle stabilizer system 220, the roll reduction control is executed although the pitch reduction control and the body-height adjustment control are not executed. In the following description, the same reference signs as used in the first embodiment will be used to identify the functionally corresponding elements, and redundant description of these elements is not provided.

The stabilizer system 220 includes a pair of stabilizer devices 222, one of which is provided for the front wheels 12FR, 12FL and the other of which is provided for the rear wheels 12RR, 12RL. Each of the stabilizer devices 222 includes a pair of stabilizer bars 224, an actuator 226 operable to rotate the stabilizer bars 224 relative to each other, and a pair of link rod 228. Each of the stabilizer bars 224 is connected at one of its axially end portions to the actuator 226, and is connected at the other of its axially end portions to a corresponding one of the right and left suspension devices 36 via a corresponding one of the link rods 228. As is apparent from FIG. 19, the stabilizer device 222 is provided for each of the front pair of wheels 12F and rear pair of wheels 12R. In the following description, the stabilizer device 222 is referred together with one of reference signs F, R indicative of the respective front and rear pairs of wheels, where it should be clarified which one of the front and rear pairs of wheels the referred stabilizer device 222 corresponds to.

Figure 20:
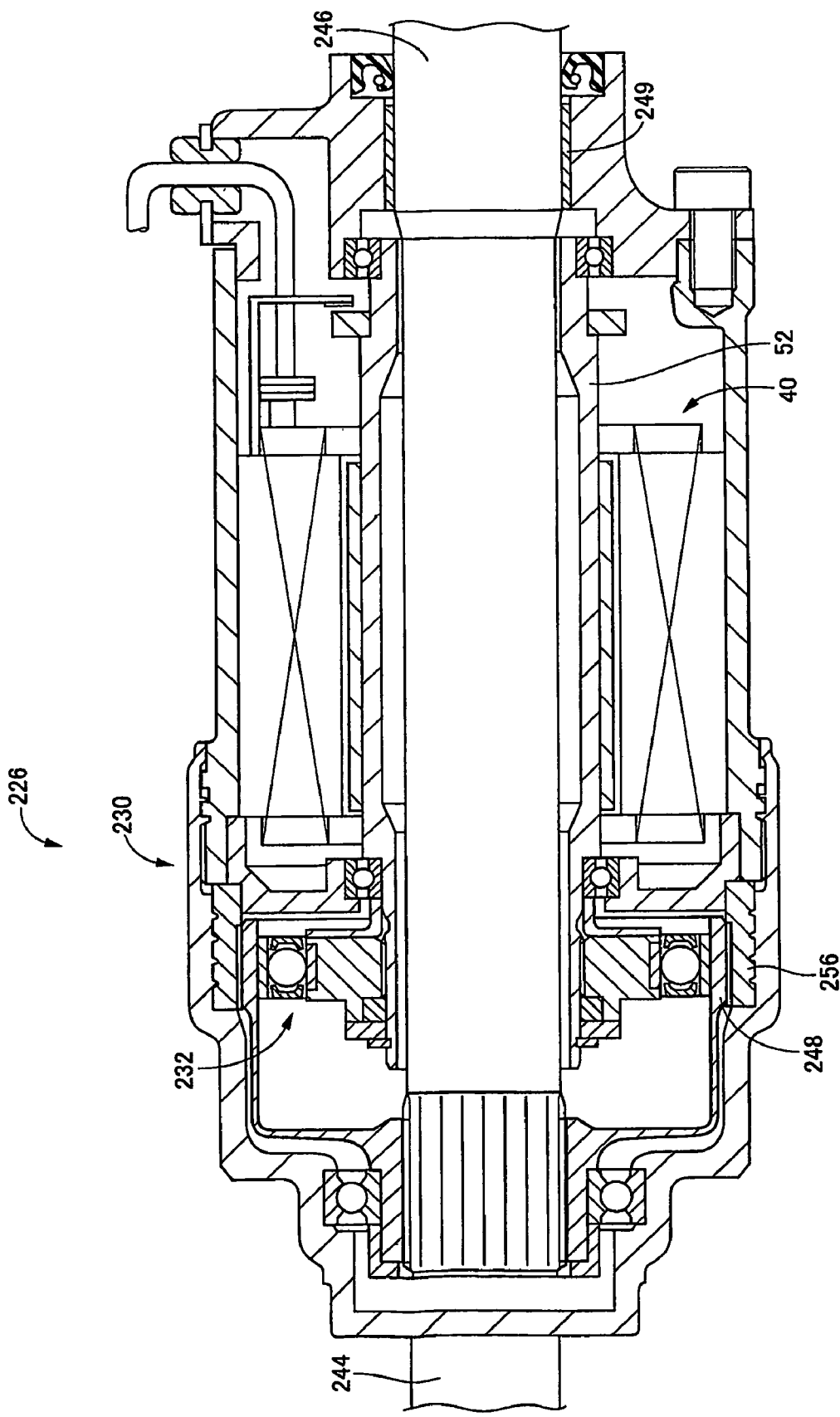
FIG. 20 is a cross sectional view of an actuator as a component of a stabilizer device of the third embodiment of the invention.

As shown in FIG. 20, the actuator 226 includes a generally cylindrical-shaped housing 230 and a speed reducer 232. The speed reducer 232 together with the motor 40 is disposed within the housing 230. Two output shafts 244, 246 project from respective opposite ends of the housing 230. One 244 of the two output shafts 244, 246 is fixedly connected to a corresponding one of the opposite ends of the housing 230. The other 246 of the two output shafts 244, 246 is introduced into the housing 230 through the other end of the housing 230, and is held by the housing 230 rotatably and axially unmovably relative to the housing 230. Described in detail, the output shaft 246 serving as an output portion of the speed reducer 232 extends through the hollow motor shaft 52 of the motor 40. An axial end portion of the output shaft 246 is located within the housing 230, and is serrated in its outer circumferential surface so as to be held in engagement with an inner circumferential surface of a hole formed through a bottom wall of a cup-shaped flexible gear 248 of the speed reducer 232 that is also serrated, whereby the output shaft 246 and the flexible gear 248 are connected to each other, unrotatably and axially unmovably relative to each other. The output shaft 246 is rotatably held at its axially intermediate portion by the housing 230 through a bearing bushing 249.

Figure 21:
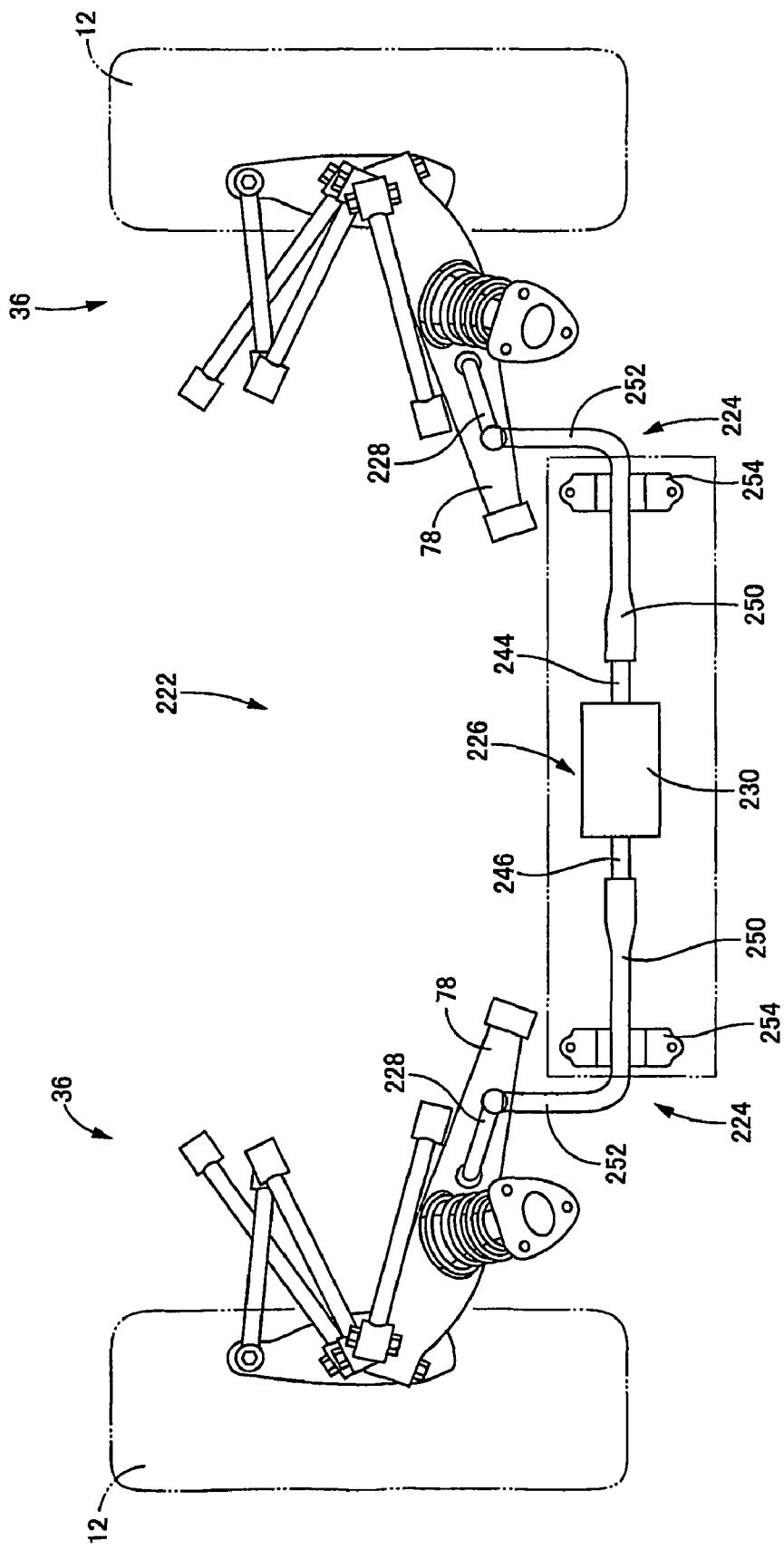
FIG. 21 is a view of the stabilizer device of the third embodiment which is connected to the suspension devices, as seen from an upper side of a vehicle.

FIG. 21 is a view of the stabilizer device 222, suspension devices 36 and right and left wheels 12, as seen from an upper side of the vehicle. Each of the stabilizer bars 224 of the stabilizer device 222 includes a torsion bar portion 250 which extends substantially in the lateral direction of the vehicle, and an arm portion 252 which is contiguous to the torsion bar portion 250 and which extends in a direction not parallel to the torsion bar portion 210, e.g., substantially in the forward direction of the vehicle. The torsion bar portion 250 of the stabilizer bar 224 is rotatably held, at its portion that is close to the arm portion 252, by a retainer 254 that is fixed to the vehicle body, such that the torsion bar portion 250 is rotatable and axially unmovable relative to a part of the vehicle body. The torsion bar portions 250 of the respective stabilizer bars 224 have respective end portions (that are located in a laterally central portion of the vehicle), which are connected to end portions of the respective output shafts 244, 246 extending from the respective opposite ends of the housing 230. Each of the torsion bar portions 250 and a corresponding one of the output shafts 244, 246 are connected to each other through a serration engagement, unrotatably relative to each other. Each of the arm portions 252 of the respective stabilizer bars 224 is connected at one of its end portions (that is remote from the torsion bar portion 250) to the second lower arm 78 of a corresponding one of the right and left suspension devices 36 via a corresponding one of the link rods 228. Like the link rod 34 of each stabilizer device 20 in the first embodiment, each of the link rods 228 that is connected to the second lower arm 78 of a corresponding one of the suspension devices 36 is inclined with respect to the second lower arm 78. Described more specifically, each of the link rods 228F is connected to a corresponding one of the second lower arms 78FR, 78FL of the front suspension devices 36FR, 36FL with inclination of each link rod 34 with respect to the corresponding second lower arm 78 such that the suspension-arm connection end portion of each link rod 34 is located on inside of another end portion of each link rod 34 in the lateral direction of the vehicle, like the link rod 34 in the first embodiment (see FIG. 5). Meanwhile, each of the link rods 228R is connected to a corresponding one of the second lower arms 78RR, 78RL of the rear suspension devices 36RR, 36RL with inclination of each link rod 34 with respect to the corresponding second lower arm 78 such that the suspension-arm connection end portion of each link rod 34 is located on outside of another end portion of each link rod 34 in the lateral direction of the vehicle, like the link rod 34 in the first embodiment (see FIG. 6).

In the stabilizer system 220 of this third embodiment, since the body-height adjustment control is not executed, it is arranged such that each of the positive efficiency and the negative efficiency of the actuator is not changed depending on the direction of the motor force. That is, unlike the actuators 32, 186 in the respective first and second embodiments, the actuator 226 in the third embodiment is not provided with the above-described actuator-efficiency changing mechanism arranged to change the actuator efficiency depending on the direction of the motor force. Each tooth of the flexible gear 248 of the speed reducer 232 has a tooth profile that is symmetrical with respect to a centerline of the tooth such that a pressure angle measured in one of opposite side portions of each tooth that are located on respective opposite sides of the centerline is the same as that measured in the other of the opposite side portions of each tooth. Similarly, each tooth of a ring gear 256 of the speed reducer 232 (meshing with the flexible gear 248) has a symmetrical tooth profile such that a pressure angle measured in a side portion of each tooth is the same as that measured in the other side portion of each tooth.

In each of the stabilizer devices 222 in the present third embodiment, the actuator 226 enables the stabilizer bars 224 to generate the right stabilizing force forcing the right wheel 12R and the vehicle body and the left stabilizing force forcing the left wheel 12L and the vehicle body, such that the right stabilizing force acts in one of the bound and rebound directions while the left stabilizing force acts in the other of the bound and rebound directions. Further, the actuator 226 is not fixed to the vehicle body so that magnitudes of the right and left stabilizing forces are substantially equal to each other. That is, the right and left stabilizing forces produced by the single actuator 226 are the same with respect to the magnitude, and are opposite to each other with respect to the direction. Further, in the stabilizer system 220 of the present third embodiment, the two stabilizing devices 222F, 222R are controllable independently of each other. That is, the stabilizing forces produced by the respective stabilizer devices 222F, 222R are controlled independently of each other, for executing the roll reduction control for reducing roll of the vehicle body.

In the vehicle equipped with the present stabilizer system 220, since the roll reduction control is executed for stabilizing posture of the vehicle body during turning of the vehicle, each of the stabilizer devices 20 is controlled to restrain displacement of the corresponding wheel 12 and the vehicle body toward or away from each other, which displacement results from turning of the vehicle. This leads to reduction in the understeer tendency as the cornering characteristic that is dependent on the above-described suspension geometry. However, as in the first embodiment, in the stabilizer device 222 in the present third embodiment, owing to the inclination of each link rod 228 as described above, a part of the stabilizing force acts on the second lower arm 78 in the axial direction of the second lower arm 78, namely, an axial force as a component of the stabilizing force acts on the second lower arm 78. Thus, each of the suspension devices 36 is given compliance by which the toe and camber angles of each wheel 12 is changed depending on the direction of the axial force acting on the second lower arm 78 of a corresponding one of the suspension devices 36, so that the reduction of the understeer tendency is sufficiently compensated by the axial force acting on the second lower arm 78 of each suspension device 36. Therefore, by employing the present stabilizer system 220, it is possible to maintain the understeer tendency as the cornering characteristic of the vehicle, while satisfactorily reducing the roll of the vehicle body.

Figure 22:
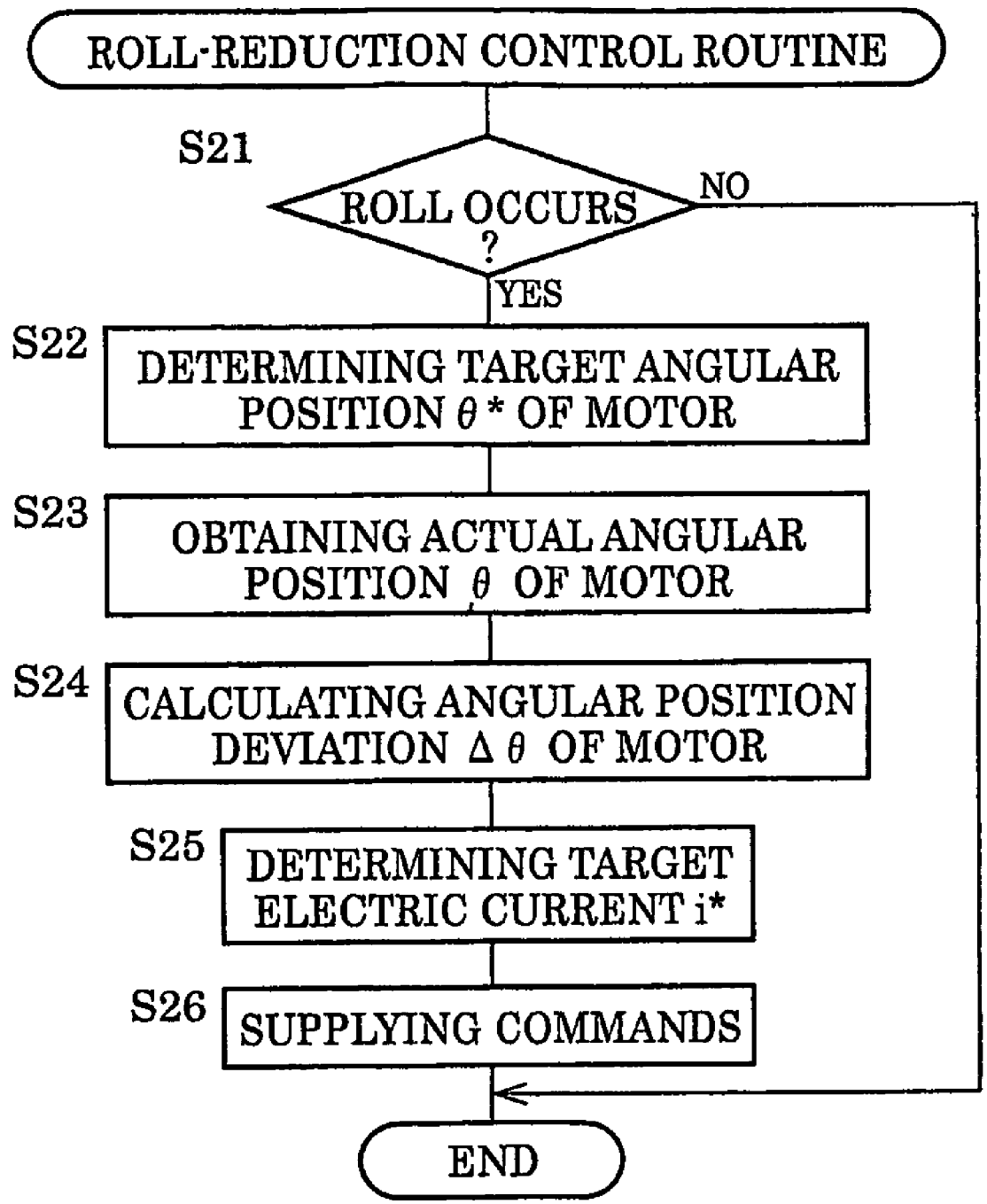
FIG. 22 is a flow chart showing a roll-reduction control routine program that is executed in the stabilizer system of the third embodiment.

The above-described roll reduction control is executed by the stabilizer ECU 150, in accordance with a roll reduction control routine program illustrated in a flow chart of FIG. 22. The roll reduction control routine program of FIG. 22 is repeatedly executed at a short time interval (e.g., several tens of milliseconds), while the ignition switch of the vehicle is placed in its ON state. Since the roll reduction control is executed in substantially the same manner as that in the first embodiment, redundant description of the control is not provided in the following description with reference to the flow chart of FIG. 22. It is noted that, in the roll reduction control in the present third embodiment, the stabilizing devices 222 provided for the front pair of wheels 12F and rear pair of wheels 12R are controlled independently of each other.

Figure 23:
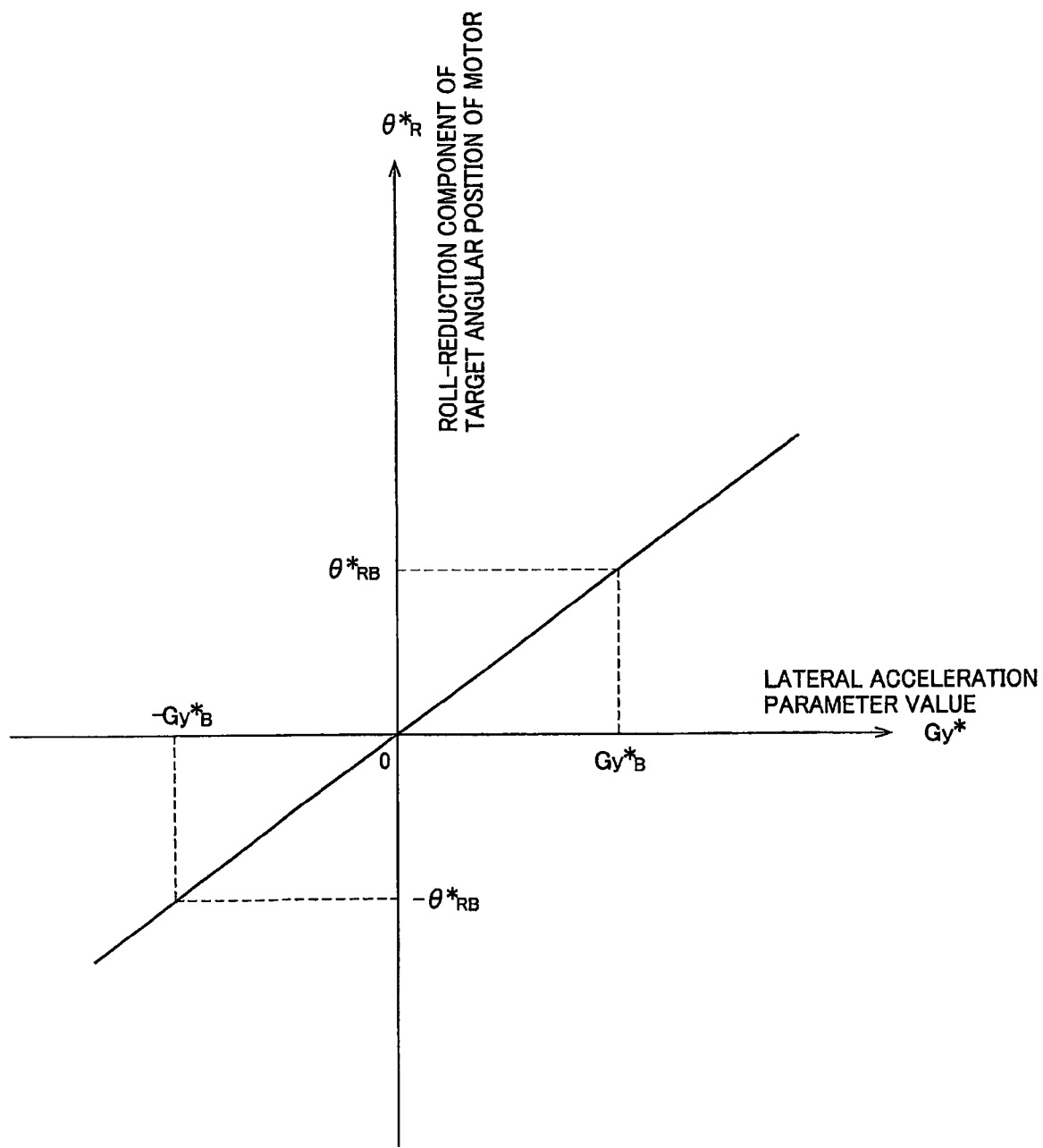
FIG. 23 is a data map representative of a relationship between a roll-reduction component of a target angular position of a motor and a lateral acceleration parameter value.

The roll reduction control routine program of FIG. 22 is initiated with a step S21 of determining whether a roll of the vehicle body occurs. If an affirmative decision is obtained in step S21, the control flow goes to step S22 that is implemented to determine the roll-reduction component $\theta^*_R$ of the target angular position of the motor 40, for executing the roll reduction control. In this instance, the roll-reduction component $\theta^*_R$ is determined with reference to a data map of FIG. 23, which is different from the data map of FIG. 12 used in the first embodiment, since the right and left stabilizing forces produced by the single actuator 226 are opposite to each other with respect to the direction. Described specifically, where the lateral acceleration parameter value Gy* is a value $Gy^*_B$ (as indicated in FIG. 23) during a left turn of the vehicle, the roll-reduction component $\theta^*_R$ of the target angular position is set at a value of $\theta^*_{RB}$. Where the lateral acceleration parameter value Gy* is a value $-Gy^*_B$ (as indicated in FIG. 23) during a right turn of the vehicle, the roll-reduction component $\theta^*_R$ of the target angular position is set at a value of $-\theta^*_{RB}$. In the present roll reduction control routine program of FIG. 22, the roll-reduction component $\theta^*_R$ of the target angular position is determined as the target angular position $\theta^*$ of the motor 40. The subsequent steps S23-S26 are implemented in substantially the same manner as the steps S8-S17 of the stabilizing control routine program of FIG. 14 in the first embodiment. However, since each of the positive efficiency and the negative efficiency of the actuator is not changed irrespective of the direction of the motor force, each of the first and second gains K1, K2 in the above equation (2) ($i^* = K_1 \cdot \Delta\theta + K_2 \cdot \theta^*$) used in determination of the target electric current i* is constant.

The invention claimed is:

1. A stabilizer system for a vehicle including a suspension arm interconnecting a wheel and a body of the vehicle, said stabilizer system comprising:
    (a) a stabilizer bar including (a-1) a torsion bar portion, and (a-2) an arm portion that extends from said torsion bar portion in a direction not parallel to said torsion bar portion;
    (b) an actuator configured to rotate said stabilizer bar about an axis of said torsion bar portion; and
    (c) a link rod interconnecting the suspension arm and one of opposite ends of said arm portion that is remote from said torsion bar portion,
    wherein said stabilizer bar generates a stabilizing force which is dependent on a reaction that is generated as a result of torsion of said torsion bar portion, and which forces the wheel and the body in a selected one of a direction toward each other and a direction away from each other,
    wherein said actuator allows said stabilizer bar to generate the stabilizing force whose magnitude is changeable by operation of said actuator,
    and wherein said link rod is inclined with respect to the suspension arm to which said link rod is connected, such that an angle defined by said link rod and the suspension arm is not 90°, and such that an axial force as a component of the stabilizing force acts on the suspension arm in an understeer-tendency increasing direction that causes at least one of a toe angle and a camber angle of the wheel to be changed in a manner increasing an understeer tendency as a cornering characteristic of the vehicle.

2. The stabilizer system according to claim 1, wherein said angle is not larger than 80°.

3. The stabilizer system according to claim 1, wherein said angle is not larger than 70°.

4. The stabilizer system according to claim 1, wherein said angle is not larger than 60°.

5. The stabilizer system according to claim 1, wherein said stabilizer bar is provided for a front wheel as said wheel such that the stabilizing force generated by said stabilizer bar forces the front wheel and the body of the vehicle.

6. The stabilizer system according to claim 5,
    wherein said link rod is inclined with respect to the suspension arm in a direction which causes the axial force to act on the suspension arm in a toe-in direction when the stabilizing force forces the front wheel and the body in the direction toward each other, and which causes the axial force to act on the suspension arm in a toe-out direction when the stabilizing force forces the front wheel and the body in the direction away from each other,
    and wherein the toe angle of the front wheel is changeable depending on a direction in which the axial force acts on the suspension arm, such that front and rear portions of the front wheel are displaced inwardly and outwardly in a lateral direction of the vehicle, respectively, when the axial force acts on the suspension arm in the toe-in direction, and such that the front and rear portions of the front wheel are displaced outwardly and inwardly in the lateral direction of the vehicle, respectively, when the axial force acts on the suspension arm in the toe-out direction.

7. The stabilizer system according to claim 5,
    wherein said link rod is inclined with respect to the suspension arm in a direction which causes the axial force to act on the suspension arm in a negative-camber direction when the stabilizing force forces the front wheel and the body in the direction toward each other, and which causes the axial force to act on the suspension arm in a positive-camber direction when the stabilizing force forces the front wheel and the body in the direction away from each other, and wherein the camber angle of the front wheel is changeable depending on a direction in which the axial force acts on the suspension arm, such that upper and lower portions of the front wheel are displaced inwardly and outwardly in a lateral direction of the vehicle, respectively, when the axial force acts on the suspension arm in the negative-camber direction, and such that the upper and lower portions of the front wheel are displaced outwardly and inwardly in the lateral direction of the vehicle, respectively, when the axial force acts on the suspension arm in the positive-camber direction.

8. The stabilizer system according to claim 1, wherein said stabilizer bar is provided for a rear wheel as said wheel such that the stabilizing force generated by said stabilizer bar forces the rear wheel and the body of the vehicle.

9. The stabilizer system according to claim 8,
wherein said link rod is inclined with respect to the suspension arm in a direction which causes the axial force to act on the suspension arm in a toe-out direction when the stabilizing force forces the rear wheel and the body in the direction toward each other, and which causes the axial force to act on the suspension arm in a toe-in direction when the stabilizing force forces the rear wheel and the body in the direction away from each other, and wherein the toe angle of the rear wheel is changeable depending on a direction in which the axial force acts on the suspension arm, such that front and rear portions of the rear wheel are displaced outwardly and inwardly in a lateral direction of the vehicle, respectively, when the axial force acts on the suspension arm in the toe-out direction, and such that the front and rear portions of the rear wheel are displaced inwardly and outwardly in the lateral direction of the vehicle, respectively, when the axial force acts on the suspension arm in the toe-in direction.

10. The stabilizer system according to claim 8,
wherein said link rod is inclined with respect to the suspension arm in a direction which causes the axial force to act on the suspension arm in a positive-camber direction when the stabilizing force forces the rear wheel and the body in the direction toward each other, and which causes the axial force to act on the suspension arm in a negative-camber direction when the stabilizing force forces the rear wheel and the body in the direction away from each other, and wherein the camber angle of the rear wheel is changeable depending on a direction in which the axial force acts on the suspension arm, such that upper and lower portions of the rear wheel are displaced outwardly and inwardly in a lateral direction of the vehicle, respectively, when the axial force acts on the suspension arm in the positive-camber direction, and such that the upper and lower portions of the rear wheel are displaced inwardly and outwardly in the lateral direction of the vehicle, respectively, when the axial force acts on the suspension arm in the negative-camber direction.

11. The stabilizer system according to claim 1, comprising:
a pair of stabilizer bars each of which is provided by said stabilizer bar;
a pair of actuators each of which is provided by said actuator; and
a pair of link rods each of which is provided by said link rod,
wherein said pair of link rods are connected to respective suspension arms each of which is provided by the suspension arm and interconnects a corresponding one of right and left wheels as said wheel and the body of the vehicle,
and wherein said torsion bar portion of each of said pair of stabilizer bars is rotated, at one of axially opposite end portions thereof that is remote from said arm portion of said each of said pair of stabilizer bars, by a corresponding one of said pair of actuators.

12. The stabilizer system according to claim 11,
wherein said actuator includes a housing fixed to the body of the vehicle, an electric motor held in said housing, and a speed reducer held in said housing and reducing a speed of motion of said motor while transmitting the motion of said motor to said torsion bar portion of said stabilizer bar,
and wherein said torsion bar portion of said stabilizer bar is connected to an output portion of said speed reducer.

13. The stabilizer system according to claim 12, wherein said speed reducer includes a harmonic gear set.

14. The stabilizer system according to claim 1, comprising a pair of link rods each of which is provided by said link rod, said link rods being connected to respective suspension arms each of which is provided by the suspension arm and interconnects a corresponding one of right and left wheels as said wheel and the body of the vehicle,
wherein said stabilizer bar includes a pair of arm portions each of which is provided by said arm portion,
wherein said pair of arm portions extend from axially opposite ends of said torsion bar portion to the respective link rods,
and wherein said torsion bar portion extends in a lateral direction of the vehicle, and is rotated, at an axially intermediate portion thereof, by said actuator.

15. The stabilizer system according to claim 14,
wherein said actuator includes a housing fixed to the body of the vehicle, an electric motor held in said housing, and a speed reducer held in said housing and reducing a speed of motion of said motor while transmitting the motion of said motor to said torsion bar portion of said stabilizer bar,
and wherein said torsion bar portion of said stabilizer bar is connected, at said axially intermediate portion thereof, to an output portion of said speed reducer.

16. The stabilizer system according to claim 15, wherein said speed reducer includes a harmonic gear set.

17. The stabilizer system according to claim 1, comprising:
a pair of stabilizer bars each of which is provided by said stabilizer bar; and
a pair of link rods each of which is provided by said link rod,
wherein said link rods are connected to respective suspension arms each of which is provided by the suspension arm and interconnects a corresponding one of right and left wheels as said wheel and the body of the vehicle,
wherein said torsion bar portion of one of said pair of stabilizer bars and said torsion bar portion of the other of said pair of stabilizer bars extend in a lateral direction of the vehicle,
wherein said torsion bar portion of said one of said pair of stabilizer bars has an end portion that is remote from said arm portion of said one of said pair of stabilizer bars, while said torsion bar portion of said other of said pair of stabilizer bars has an end portion that is remote from said arm portion of said other of said pair of stabilizer bars, such that the end portions of the torsion bar portions of the respective stabilizer bars are opposed to each other, and wherein said torsion bar portions of said respective stabilizer bars are rotated, at said end portions thereof, relative to each other by said actuator.

18. The stabilizer system according to claim 17, wherein said actuator includes a housing, an electric motor held in said housing, and a speed reducer held in said housing and reducing a speed of motion of said motor while transmitting the motion of said motor, and wherein said torsion bar portion of said one of said pair of stabilizer bars is connected, at said end portion thereof, to said housing, while said torsion bar portion of said other of said pair of stabilizer bars is connected, at said end portion thereof, to an output portion of said speed reducer.

19. The stabilizer system according to claim 18, wherein said speed reducer includes a harmonic gear set.

20. A stabilizer system for a vehicle including a suspension arm interconnecting a wheel and a body of the vehicle, said stabilizer system comprising:
    (a) a stabilizer bar including (a-1) a torsion bar portion, and (a-2) an arm portion that extends from said torsion bar portion in a direction not parallel to said torsion bar portion;
    (b) an actuator configured to rotate said stabilizer bar about an axis of said torsion bar portion; and
    (c) a link rod interconnecting the suspension arm and one of opposite ends of said arm portion that is remote from said torsion bar portion,
    wherein said stabilizer bar generates a stabilizing force which is dependent on a reaction that is generated as a result of torsion of said torsion bar portion, and which forces the wheel and the body in a selected one of a direction toward each other and a direction away from each other,
    wherein said actuator allows said stabilizer bar to generate the stabilizing force whose magnitude is changeable by operation of said actuator,
    wherein said link rod is inclined with respect to the suspension arm to which said link rod is connected, such that an angle defined by said link rod and the suspension arm is not 90°,
    wherein said stabilizer bar is provided for a front wheel as said wheel such that the stabilizing force generated by said stabilizer bar forces the front wheel and the body of the vehicle,
    wherein said link rod is inclined with respect to the suspension arm in a direction which causes the axial force to act on the suspension arm in a toe-in direction when the stabilizing force forces the front wheel and the body in the direction toward each other, and which causes the axial force to act on the suspension arm in a toe-out direction when the stabilizing force forces the front wheel and the body in the direction away from each other,
    and wherein the toe angle of the front wheel is changeable depending on a direction in which the axial force acts on the suspension arm, such that front and rear portions of the front wheel are displaced inwardly and outwardly in a lateral direction of the vehicle, respectively, when the axial force acts on the suspension arm in the toe-in direction, and such that the front and rear portions of the front wheel are displaced outwardly and inwardly in the lateral direction of the vehicle, respectively, when the axial force acts on the suspension arm in the toe-out direction.

21. A stabilizer system for a vehicle including a suspension arm interconnecting a wheel and a body of the vehicle, said stabilizer system comprising:
    (a) a stabilizer bar including (a-1) a torsion bar portion, and (a-2) an arm portion that extends from said torsion bar portion in a direction not parallel to said torsion bar portion;
    (b) an actuator configured to rotate said stabilizer bar about an axis of said torsion bar portion; and
    (c) a link rod interconnecting the suspension arm and one of opposite ends of said arm portion that is remote from said torsion bar portion,
    wherein said stabilizer bar generates a stabilizing force which is dependent on a reaction that is generated as a result of torsion of said torsion bar portion, and which forces the wheel and the body in a selected one of a direction toward each other and a direction away from each other,
    wherein said actuator allows said stabilizer bar to generate the stabilizing force whose magnitude is changeable by operation of said actuator,
    wherein said link rod is inclined with respect to the suspension arm to which said link rod is connected, such that an angle defined by said link rod and the suspension arm is not 90°,
    wherein said stabilizer bar is provided for a front wheel as said wheel such that the stabilizing force generated by said stabilizer bar forces the front wheel and the body of the vehicle,
    wherein said link rod is inclined with respect to the suspension arm in a direction which causes the axial force to act on the suspension arm in a negative-camber direction when the stabilizing force forces the front wheel and the body in the direction toward each other, and which causes the axial force to act on the suspension arm in a positive-camber direction when the stabilizing force forces the front wheel and the body in the direction away from each other,
    and wherein the camber angle of the front wheel is changeable depending on a direction in which the axial force acts on the suspension arm, such that upper and lower portions of the front wheel are displaced inwardly and outwardly in a lateral direction of the vehicle, respectively, when the axial force acts on the suspension arm in the negative-camber direction, and such that the upper and lower portions of the front wheel are displaced outwardly and inwardly in the lateral direction of the vehicle, respectively, when the axial force acts on the suspension arm in the positive-camber direction.

22. A stabilizer system for a vehicle including a suspension arm interconnecting a wheel and a body of the vehicle, said stabilizer system comprising:
    (a) a stabilizer bar including (a-1) a torsion bar portion, and (a-2) an arm portion that extends from said torsion bar portion in a direction not parallel to said torsion bar portion;
    (b) an actuator configured to rotate said stabilizer bar about an axis of said torsion bar portion; and
    (c) a link rod interconnecting the suspension arm and one of opposite ends of said arm portion that is remote from said torsion bar portion,
    wherein said stabilizer bar generates a stabilizing force which is dependent on a reaction that is generated as a result of torsion of said torsion bar portion, and which forces the wheel and the body in a selected one of a direction toward each other and a direction away from each other, wherein said actuator allows said stabilizer bar to generate the stabilizing force whose magnitude is changeable by operation of said actuator, wherein said link rod is inclined with respect to the suspension arm to which said link rod is connected, such that an angle defined by said link rod and the suspension arm is not 90°, wherein said stabilizer bar is provided for a rear wheel as said wheel such that the stabilizing force generated by said stabilizer bar forces the rear wheel and the body of the vehicle, wherein said link rod is inclined with respect to the suspension arm in a direction which causes the axial force to act on the suspension arm in a toe-out direction when the stabilizing force forces the rear wheel and the body in the direction toward each other, and which causes the axial force to act on the suspension arm in a toe-in direction when the stabilizing force forces the rear wheel and the body in the direction away from each other, and wherein the toe angle of the rear wheel is changeable depending on a direction in which the axial force acts on the suspension arm, such that front and rear portions of the rear wheel are displaced outwardly and inwardly in a lateral direction of the vehicle, respectively, when the axial force acts on the suspension arm in the toe-out direction, and such that the front and rear portions of the rear wheel are displaced inwardly and outwardly in the lateral direction of the vehicle, respectively, when the axial force acts on the suspension arm in the toe-in direction.

23. A stabilizer system for a vehicle including a suspension arm interconnecting a wheel and a body of the vehicle, said stabilizer system comprising:
(a) a stabilizer bar including (a-1) a torsion bar portion, and (a-2) an arm portion that extends from said torsion bar portion in a direction not parallel to said torsion bar portion;
(b) an actuator configured to rotate said stabilizer bar about an axis of said torsion bar portion; and
(c) a link rod interconnecting the suspension arm and one of opposite ends of said arm portion that is remote from said torsion bar portion, wherein said stabilizer bar generates a stabilizing force which is dependent on a reaction that is generated as a result of torsion of said torsion bar portion, and which forces the wheel and the body in a selected one of a direction toward each other and a direction away from each other, wherein said actuator allows said stabilizer bar to generate the stabilizing force whose magnitude is changeable by operation of said actuator, wherein said link rod is inclined with respect to the suspension arm to which said link rod is connected, such that an angle defined by said link rod and the suspension arm is not 90°, wherein said stabilizer bar is provided for a rear wheel as said wheel such that the stabilizing force generated by said stabilizer bar forces the rear wheel and the body of the vehicle, wherein said link rod is inclined with respect to the suspension arm in a direction which causes the axial force to act on the suspension arm in a positive-camber direction when the stabilizing force forces the rear wheel and the body in the direction toward each other, and which causes the axial force to act on the suspension arm in a negative-camber direction when the stabilizing force forces the rear wheel and the body in the direction away from each other, and wherein the camber angle of the rear wheel is changeable depending on a direction in which the axial force acts on the suspension arm, such that upper and lower portions of the rear wheel are displaced outwardly and inwardly in a lateral direction of the vehicle, respectively, when the axial force acts on the suspension arm in the positive-camber direction, and such that the upper and lower portions of the rear wheel are displaced inwardly and outwardly in the lateral direction of the vehicle, respectively, when the axial force acts on the suspension arm in the negative-camber direction.

* * * * *